US005592556A

United States Patent [19]

Schwed

[11] Patent Number: 5,592,556

[45] Date of Patent: Jan. 7, 1997

[54] DIGITAL RADIO WITH VOCODING ENCRYPTING CODEC

[75] Inventor: Daniel I. Schwed, Lynchburg, Va.

[73] Assignee: Ericsson GE Mobile Communications Inc., Lynchburg, Va.

[21] Appl. No.: 287,812

[22] Filed: Aug. 9, 1994

[51] Int. Cl.$^{6}$ .......................... H04L 9/00

[52] U.S. Cl. .......................... 380/49

[58] Field of Search .......................... 380/33, 34, 25, 380/49; 395/2.32

[56] References Cited

U.S. PATENT DOCUMENTS

| | | | |
|---|---|---|---|
| 4,396,802 | 8/1983 | Hurst | 380/49 |
| 4,757,536 | 7/1988 | Szczutkowski et al. | 380/49 |
| 4,817,146 | 3/1989 | Szczutkowski et al. | 380/49 |
| 4,972,478 | 11/1990 | Dabbish . | |
| 5,103,459 | 4/1992 | Gilhousen et al. | 380/34 |
| 5,150,401 | 9/1992 | Ashby, III et al. | 380/34 |
| 5,153,918 | 10/1992 | Tuai | 380/25 |
| 5,305,384 | 4/1994 | Ashby et al. | 380/33 |
| 5,371,853 | 12/1994 | Kao et al. | 395/2.32 |
| 5,416,797 | 5/1995 | Gilhousen et al. | 380/34 |

FOREIGN PATENT DOCUMENTS

| | | |
|---|---|---|
| 0425964A2 | 5/1991 | European Pat. Off. . |
| 0578361A1 | 1/1994 | European Pat. Off. . |
| 2133255 | 7/1984 | United Kingdom . |
| WO9215159 | 9/1992 | WIPO . |

OTHER PUBLICATIONS

*Bell System Technical Journal*, vol. 60, No. 7, Sep. 1981, Murray Hill (US), pp. 1563–1572, McGonegal et al., "Private Communications,", p. 1563, line 1 to p. 1564, line 15.

Kuisma et al., "Signal Processing Requirements in Pan–European Digital Mobil Communications," p. 1807, left col., line 10 to p. 1808, right col., line 9, and p. 1808, left col., last paragraph to right col., line 13; and figure 6.

O'Connor et al., "Implementation of Secure Voice (STU–III) Into the Land Mobile Satellite System," Conference Record, vol. 1 of 3, pp. 5.5.1–5.5.4, *Communications–Fusing Command Control and Intelligence*, San Diego, California (Oct. 1992).

*Primary Examiner*—Salvatore Cangialosi
*Attorney, Agent, or Firm*— Nixon & Vanderhye P.C.

[57] ABSTRACT

A new digital radio includes codec, vocoder and encryption/decryption processing all on a single integrated circuit chip module. Great flexibility is provided in terms of different operating modes (e.g., encrypt/decrypt only, vocode only, or encrypt/decrypt and vocode). Radio control processor overhead is reduced substantially, because the radio control processor does not need to transfer data between codec, vocoder and encryption/decryption processes and/or components. An internal executive routine within the module handles all vocoder and encryption command and data processing. A special synchronization scheme is provided to synchronize the transceiver modem rate with the speech processing rate. The single-chip speech processing module is sufficiently flexible to allow users to define, write, load and use their own encryption/decryption routines without requiring a new masked ROM.

11 Claims, 17 Drawing Sheets

*FIG. 3*
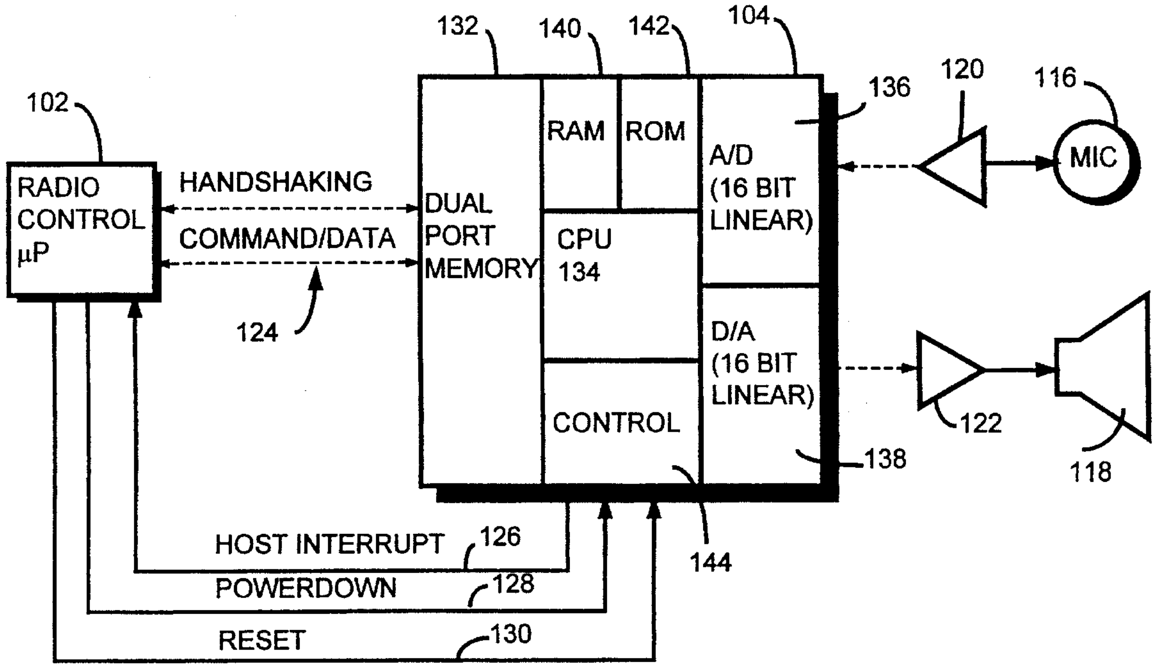
*FIG. 4A(Tx)*
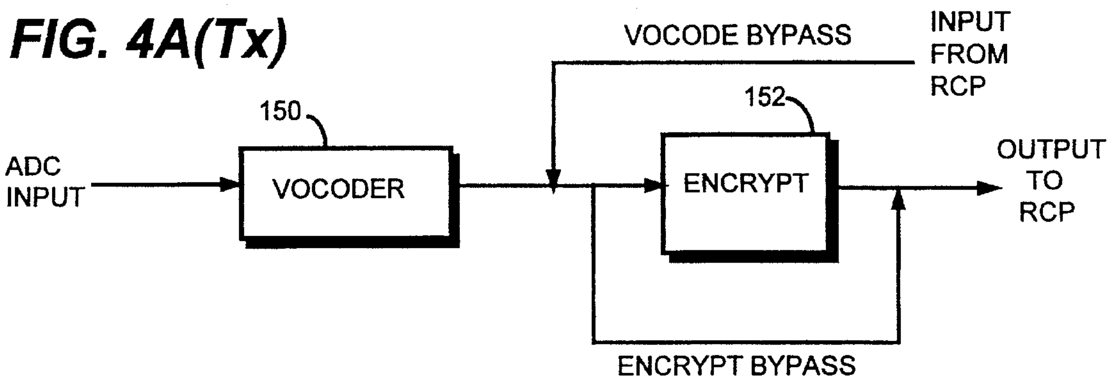
*FIG. 4B(Rx)*
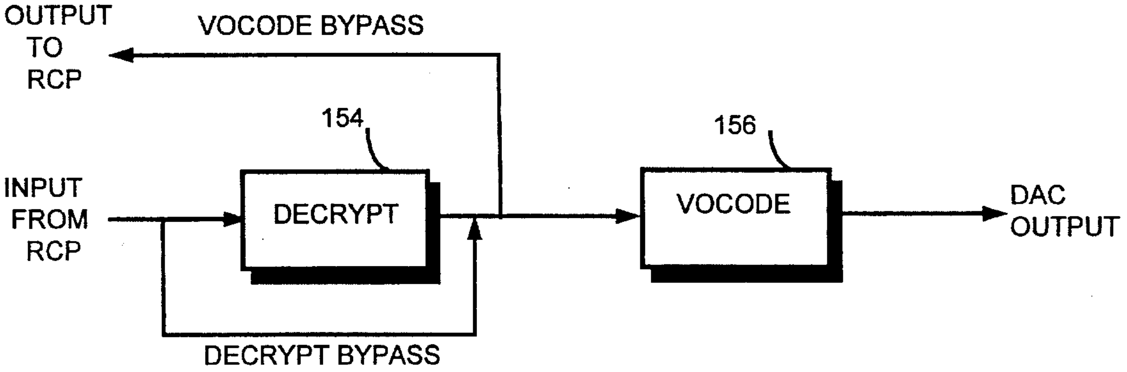

RUN-TIME HIP REGISTER CONFIGURATION:

Tx MODE
(BOTH VOCODE AND ENCRYPT, OR VOCODE ONLY)

Rx MODE
(BOTH VOCODE AND DECRYPT, OR VOCODE ONLY)

Tx MODE (ENCRYPT ONLY)

Rx MODE (DECRYPT ONLY)

VOCODING ONLY-TRANSMIT (RCP)

VOCODING ONLY- RECEIVE (RCP)

VOCODING & ENCRYPTION - TRANSMIT (RCP)

DIGITAL RADIO WITH VOCODING ENCRYPTING CODEC

FIELD OF THE INVENTION

The present invention relates to a digital radio for transmitting and receiving digital signals over-the-air. More particularly, the present invention relates to digital radio digital signal processing for encoding and decoding transmitted and/or received digital signals. Still more particularly, the present invention relates to a digital radio architecture and processing technique for efficiently and cost-effectively "vocoding" and encrypting/decrypting digitized speech signals for over the air transmission and/or reception.

BACKGROUND AND SUMMARY OF THE INVENTION

In the past, two-way radio transceivers transmitted and received speech signals in analog form. An audio speech signal produced by a microphone at the transmitter was amplified and processed by analog circuits, and applied to the RF transmitter for "modulating" an RF carrier signal. The RF carrier carrying this analog audio signal was transmitted over the air and received by the receiver. The receiver "demodulated" the received RF signal to recover the analog audio signal, which it then amplified and applied to a loudspeaker. In this way, a person at the receiver could hear the words spoken by the person at the transmitter.

More and more throughout the communications industry, digital signal processing techniques are replacing analog techniques. Modern two-way radio transceivers employ significant digital signal processing capabilities, and perform on digital signals many of the processes that used to be performed in the analog domain. FIG. 1 is a schematic illustration of an example of some of the digital signal processing performed by a modern digital two-way radio.

FIG. 1 shows two radio transceivers 50A, 50B. Each of these transceivers 50A, 50B can transmit or receive. In FIG. 1, transceiver 50A on the left is shown in the transmit mode, and transceiver 50B on the right is shown operating in the receive mode. Thus, speech spoken at the transmitter 50A is carried on a radio wave W over the air to the receiver 50B where it can be heard by someone at the receiver end.

To transmit signals over the air, the user speaks into a microphone 52 at transmitting radio 50A. Microphone 52 converts the user's speech sounds into an analog audio signal. This analog audio signal is applied to a digital conversion process 54 that converts the analog audio signal into digital signals. The resulting digital signals are then "compressed" by a compression process 56. The purpose of this "compression" is to decrease the overall "data rate" of the digital signals. By squeezing the digital signals into a smaller "bandwidth," radio 50 can achieve higher speech fidelity (frequency range) over the narrow bandwidth of a radio channel.

The compressed digital signals are then applied to an encryption process 58. Encryption process 58 uses a special mathematical transformation known as "encryption" (also known as "enciphering") to convert the digital signals into a form that is unintelligible to anyone who does not know the special inverse "decryption" transformation needed to transform the signals back into their original ("clear" or "plain text") form. Encryption is used to ensure secrecy of the communications by preventing eavesdroppers intercepting the communications without authorization from understanding the communications. The output of encryption process 58 is applied to a modulation process 60 which "modulates" a RF carrier with the encrypted digital data. The RF carrier is applied to antenna 62*a* for radiation over the air.

Radio 50B in the receive mode receives the transmitted RF signal on its antenna 62*b* and "demodulates" the RF carrier to recover the original digital signal generated by encryption process 58 within the transmitting radio 50A. Demodulation process 64 is the inverse of modulation process 60. This recovered encrypted digital signal is applied to a decrypting process 66. Decrypting process 66 performs the inverse of the encryption process 58, and thus transforms the encrypted received digital signals back into unencrypted ("plain text") digital signals. These "clear" digital signals are run through an "expanding" process 68 which performs an inverse of the compression process 56. The resulting decompressed digital signals are applied to the input of an analog conversion process 70 that performs the inverse of digital conversion process 54 within transmitting radio 50A, i.e., it converts the digital signals back into analog signals. These analog signals are amplified and applied to a loudspeaker 72. The loudspeaker 72 converts the analog signals into sound waves so that a person at the receiving can hear the same sounds spoken by the person at the transmitting end.

Prior to this invention, digital radios manufactured and sold by Ericsson-GE Mobile Radio Communications Inc. (the assignee of this patent) used separate integrated circuit chips to perform the "codec" processes 54, 70;the compression/decompression processes 56, 68; and the encrypting/decrypting processes 58, 66. For example, Ericsson-GE's prior MPA, MPD and AEGIS digital two-way radio products used commercially-available chips called "codecs" (coder and decoder) to perform the analog-to-digital and digital-to-analog conversion processes 54, 70. These prior products used a separate programmed digital signal processor (DSP) chip to perform the "vocoding" processes 56, 68, compressing the digital signal on the transmit end and expanding the digital signal on the receive end. Commercially-available encryption/decryption ASIC chips were used in these products to encrypt and decrypt the digital signals per processes 56, 66.

In these products, a radio control processor (a further microprocessor chip) was used to coordinate operations between the codec, the vocoder DSP, and the encryptor/decryptor ASIC chip. This additional microprocessor chip (which typically also provided all of the high level control functions for the entire radio) moved speech data between the codec chip and the vocoding DSP chip; between the vocoding DSP chip and the encryptor/decryptor chip; and between the encryptor/decryptor chip and a transceiver modem. These data transfers were asynchronous, and the control microprocessor was required to reformat the data to at each of these transfer stages match the requirements of the codec chip, the vocoding DSP chip, and the encryptor/decryptor chip. These real time functions imposed significant timing constraints on the control microprocessor, since it required several different data protocols, a data translation process, and timing-sensitive implementation. In addition, this 3-chip architecture (in addition to the control microprocessor) had the disadvantage of increasing the cost of the radio and limiting its flexibility.

To solve these problems, a mixed signal, digital signal processor had been designed to incorporate the codec, vocoding and encryption processes in a single chip. Briefly, in accordance with the preferred embodiment of the present invention, a single digital signal processor module (DSP)

performs the "vocoding" process (speech compression and decompression) and the encryption/decryption process in an integrated manner in real time. The preferred embodiment employs a DSP chip including a built-in analog-to-digital converter and digital-to-analog converter, so that the "codec" process can also be integrated into the same speech processing module. The speech processing module provided by the present invention thus performs any/all of analog/digital conversion, speech vocoding, and encryption/decryption in real time without need for intervention by the radio control processor. The speech processing module of the preferred embodiment isolates the radio control microprocessor from the data-handoff between vocode and encrypt operations. This results in less data shuffling and fewer commands. Therefore, the control microprocessor no longer requires digital speech processing to occur in high priority interrupts. In addition, only one new protocol is needed between the radio control microprocessor and the speech processing module.

Some of the features and advantages provided by the present invention include:

- Codec, compression and encryption functions are all combined within a single digital signal processor integrated circuit chip.
- Compression and encryption are performed in a real time integrated manner without need for external intervention by the control processor.
- Protocol between the speech processing module and the radio control processor provides for efficient data transfers without undue loading of radio control processor.
- Internal executive routine within speech processing module handles vocoder/encryption commands and data processing.
- User-defined encryption feature.
- Modem/codec synchronization handled automatically.
- DES encryption is directly integrated in software with a radio product.
- Fewer chips.
- Less control processor loading.
- Increased flexibility.
- Radio control processor can control speech processing module to operate as stand-alone encryptor/decryptor.
- Real time speech processing with selectable vocode only, encrypt only, or vocode and encrypt.

BRIEF DESCRIPTION OF THE DRAWINGS

These and other features and advantages provided by the present invention may be better and more completely understood by referring to the following detailed description of a presently preferred embodiment of the invention in conjunction with the drawings, of which:

FIG. 3 is a more detailed schematic diagram showing interconnections between the radio control microprocessor and the speech processing module shown in FIG. 2, and also showing some of the architectural details within the speech processing module;

FIGS. 4A and 4B are schematic illustrations of overall processing performed by the speech processing module of FIG. 2 in the transmit and receive modes, respectively;

DETAILED DESCRIPTION OF A PRESENTLY PREFERRED EXEMPLARY EMBODIMENT

Figure 1:
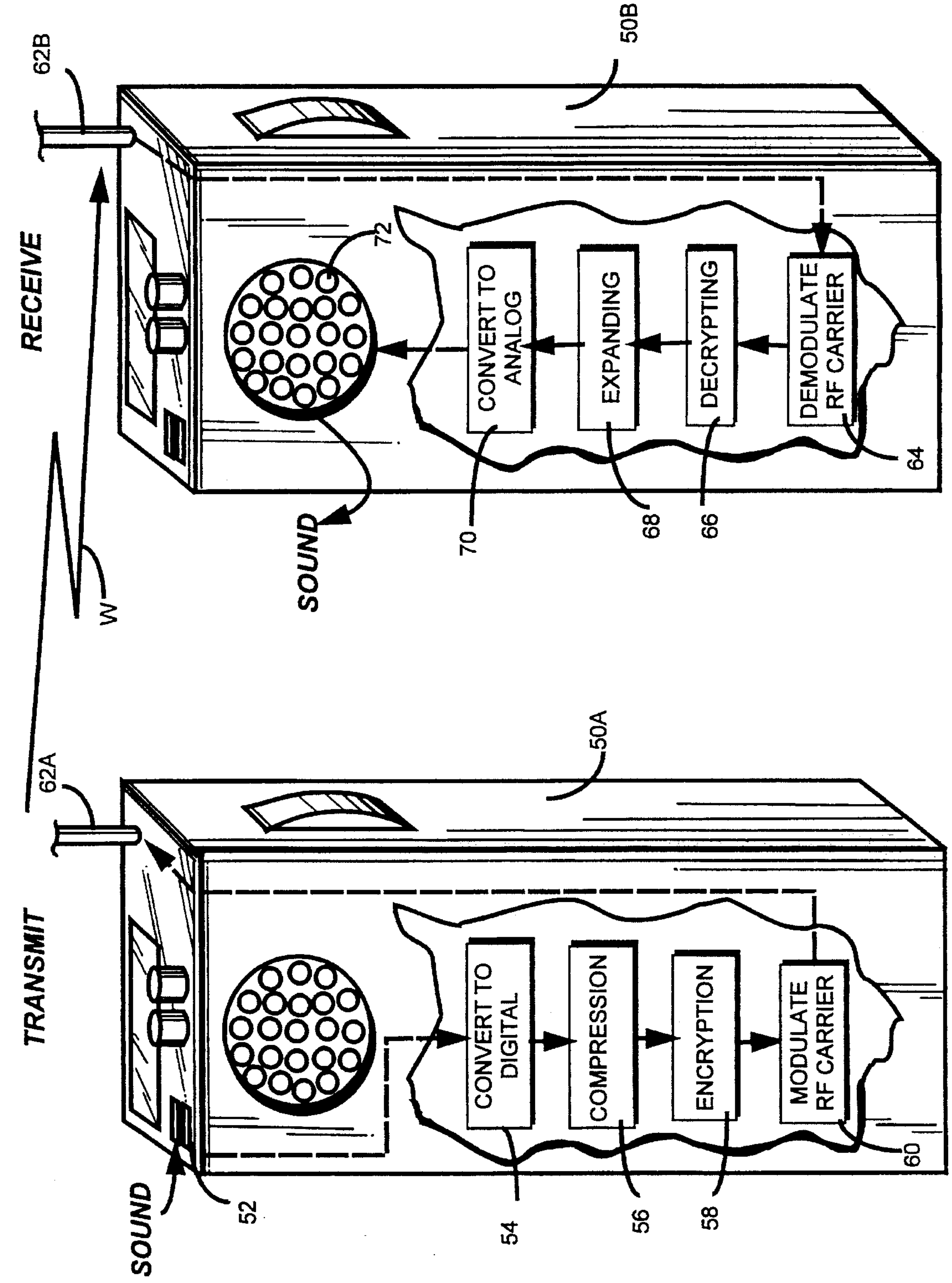
FIG. 1 is a schematic illustration of signal processing operation performed within a typical modern digital two-way radio system.
Figure 2:
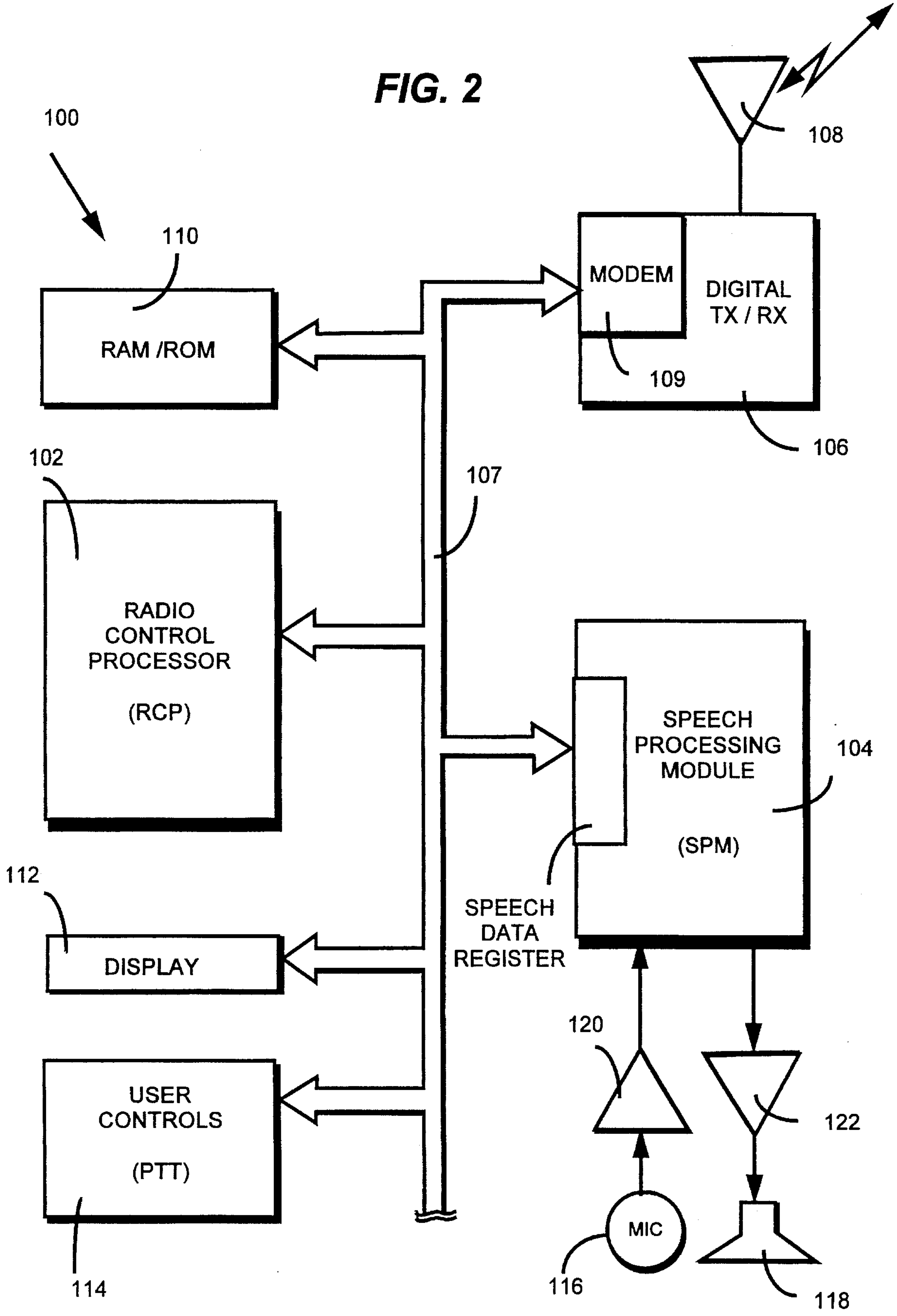
FIG. 2 is a schematic block diagram of a presently preferred embodiment of a digital radio transceiver in accordance with the present invention.

FIG. 2 is a schematic block diagram of a presently preferred exemplary embodiment of a digital radio transceiver ("radio") 100 in accordance with the present invention. Radio 100 includes a radio control processor ("RCP") 102, a speech processing module ("SPM") 104, and a digital transmitter/receiver module 106. RCP 102 communicates with SPM 104 and the other components of radio 100 via a conventional microprocessor data bus 107. Radio control processor 102 may comprise a conventional high-speed microcontroller that performs functions based on program control instructions stored within a RAM/ROM 110. RCP 102 provides the "brain" for radio 100 by, for example, monitoring user controls 114 for commands input by a user; causing a display device 112 to display information to the user; activating and deactivating (and otherwise controlling) the transmit/receive module 106; and controlling the operation of SPM 104.

As can be seen in FIG. 2, SPM 104 is connected to RCP 102 by the microprocessor data bus 107. SPM 104 also receives, as an input, the amplified audio analog output of a microphone 116 (op amp 120 acts as an amplifier). SPM 104 includes a built-in 16-bit linear analog-to-digital converter 136 (see FIG. 3) that is connected to microphone 116 via amplifier 120. A/D converter 136 converts the analog signal provided by microphone 116 into 16-bit digital words in a conventional manner. SPM 104 also generates an analog audio output for amplification by operational amplifier 122 before being applied to loudspeaker 118. SPM 104 includes another 16-bit linear digital-to-analog converter 138 that converts digital signals provided by the SPM into analog signals for application to loudspeaker 118 via amplifier 122.

Looking again at FIG. 2, digital transmitter/receiver 106 includes a bidirectional modem 109. When the transmitter/receiver 106 receives and successfully decodes digital data, it places the received digital data in a data register within modem 109 and then alerts RCP 102 (e.g., via an "interrupt") that data has arrived. Similarly, RCP 102 can cause transmitter/receiver 106 to transmit data by writing data to the modem 109. Modem 109 in the preferred embodiment operates on 8 bits of data at a time. Thus, RCP 102 must, in the preferred embodiment, maintain necessary conventional buffering and flow control to guard against modem data underflows and overflows at the relatively high data rate (9600 baud) of modem 109 and the over-the-air digital protocol used by the preferred embodiment.

Still looking at FIG. 2, assume that radio 100 is operating in the receive mode so that digital data being received will appear a byte at a time at the microprocessor interface to modem 109. RCP 102 in the preferred embodiment reads this received data, examines it to see if it is speech data, and if it is, writes it to a "speech data register" of SPM 104. RCP 102 writes commands to SPM 104 beforehand that instruct the SPM how to process the data it writes to the SPM. The following speech processing options are possible in the preferred embodiment in the receive mode:

a) expand, convert to analog signal, and apply to loudspeaker 118;

b) expand, decrypt, convert to analog signal, and apply to loudspeaker 118.

In the transmit mode (i.e., when the user depresses the "push-to-talk" button), RCP 102 must supply digital data to modem 109 at a 9600 baud rate in the preferred embodiment. In this case, RCP 102 controls SPM 104 to begin digitizing the analog signal from microphone 116 into digital form. RCP 102 can control SPM 104 to:

a) convert from analog to digital, and compress the digital signals; or b) convert from analog to digital, compress and encrypt the digital signals.

SPM 104 performs the processing as instructed by the RCP 102, and provides the processed digital data, a byte at a time, to RCP 102 via the SPM "speech data register." RCP 102 meanwhile formulates a transmit protocol data stream including "headers" and other information, and sends this data stream (including inserted speech data provided by SPM 104) to modem 109, for transmission.

Sometimes, radio 100 must handle encrypted data other than encrypted speech data. Certain non-speech data elements within a communications protocol may be encrypted (e.g., the radio 100 may be transceiving encrypted data from a mobile data terminal). In this case, RCP 102 can control SPM 104 to operate as an encryptor/decryptor without processing speech data in real time. In this mode, SPM 104 will encrypt (decrypt) data sent to it by RCP 102 via the "speech data register", and provide the resulting encrypted (decrypted) data back to the RCP via the "speech data register" for further handling (e.g., display on a mobile data terminal, transmission, etc.)

More Details About the Structure of the Speech Processing Module

FIG. 3 is a more detailed schematic diagram showing interconnections between the RCP 102 and SPM 104, and also showing some of the internal architectural details of the SPM. SPM 104 in the preferred embodiment comprises a mixed signal processor based on a model ADSP-21msp56 manufactured by Analog Devices, Inc., Norwood, Mass. 02062. The ADSP-21msp56A mixed signal processor is a fully integrated, single chip digital signal processor with a high performance analog front end. The ADSP-21msp56 is optimized by the manufacturer for voice band applications, such as speech compression, speech processing, speech recognition, text-to-speech and speech-to-text conversion. The ADSP-21msp56 includes the base architecture of the ADSP-2100dsp, and adds two serial ports, a host interface port, the analog front end discussed above, a programmable timer, extensive interrupt capabilities, and on-chip program and data memory. Detailed information about this digital signal processor device may be found in the following publications:

"Mixed-Signal Processor With Host Interface Port ADSP-20msp50A/55A/56A" (Analog Devices, September 1990);

"ADSP-21msp50-51-55-56 Addendum to September 1990 Data Sheet" (Analog Devices, July 1992);

"Mixed-Signal Processor With Host Interface Port ADSP-20msp50A/55A/56A" (Analog Devices, Rev. A 1993)

"ADSP-21 Family User's Manual" (Prentice Hall 1993)

"ADSP-2100 Family Assembly Tools and Simulator Manual" (Analog Devices, 1st Edition, 11/93)

In the preferred embodiment, handshaking and command/data signals are passed between RCP 102 and SPM 104 via the data bus 107. In addition, there are three dedicated control lines connected between the RCP 102 and the SPM 104:

host interrupt line 126 (which is output by the SPM and applied to an interrupt input of the RCP );

powerdown control line 128 (output by the RCP and applied to a control input of SPM); and reset control line 130 (output by the RCP to a control input of SPM).

Through these dedicated control lines 126, 128, 130, the RCP 102 has control of the SPM's reset and power up lines, and the SPM has the ability to "interrupt" the RCP. SPM 104 using its output flag, F0, to interrupt RCP 102. The output flag goes from high to low to initiate an RCP interrupt. The output flag goes from low to high to clear the interrupt.

Figure 3A:
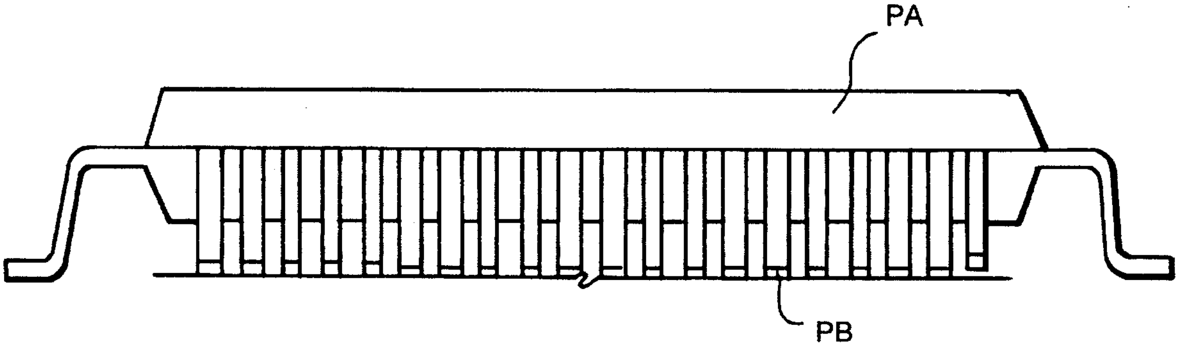
FIGS. 3A and 3B show external views of an example of the speech processing module integrated circuit chip provided by the present invention.
Figure 3B:
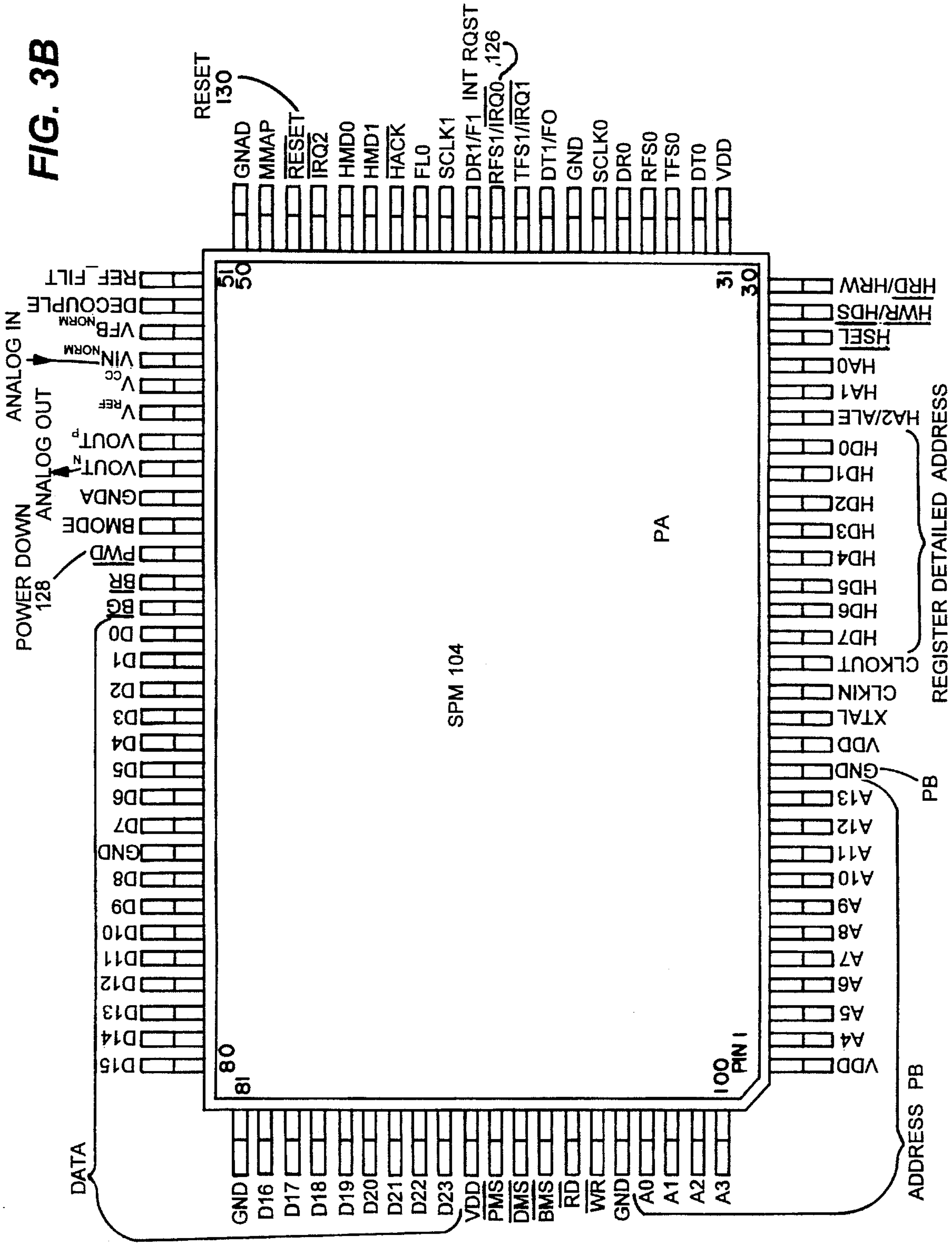

FIGS. 3A and 3B show respectively a side elevated view and a top view in plan of the SPM 104 of the preferred embodiment. As shown in FIG. 3A, SPM 104 in form form includes a flat PQFP package PA with 100 leads or pins PB. FIG. 3B shows an examplary "pinout" including pins for an analog input, an analog output, reset line 130, host interrupt request line 126, power down line 128, data lines and address lines. FIG. 3B also shows lines "HD7–HD0" that allow RCP 102 to access internal registers within the SPM 104.

Memory Architecture of SPM 104

In the preferred embodiment, registers within the SPM 104 are within the address space of RCP 102 in that RCP 102 can access them directly just like any other memory location. SPM 104 includes an internal dual port memory 132 for providing these registers. This memory 132 is "dual port" in the sense that the core DSP processor 134 within the SPM 104 and RCP 102 may both access the dual port memory. Memory 132 has built in handshaking status to keep the SPM 104 and RCP 102 from colliding in a data memory location during reads and writes.

Figure 10:
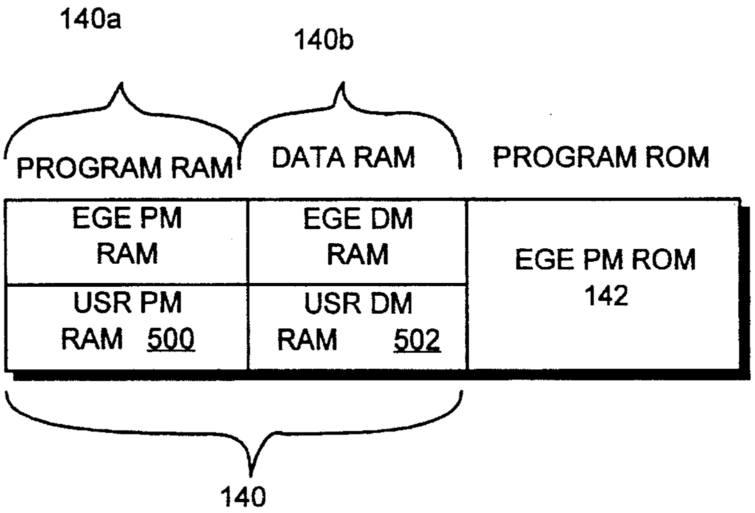
FIG. 10 is a schematic illustration of the memory organization of the speech processing module shown in FIG. 2.

FIG. 3 shows that SPM 104 includes an additional RAM 140 and ROM 142. RAM 140 and ROM 142 are on board the SPM 104 chip in the preferred embodiment. The ROM 142 is used to store program instructions for SPM 104, and RAM 140 can be used to store program instructions and/or data. FIG. 10 is a schematic illustration of general memory partitioning for the RAM 140 and ROM 142 within the SPM 104. The RAM 140 includes a section of RAM designated as "program RAM" 140A, and another section of RAM designated as "data RAM" 140B. The program RAM 140A supplements the program ROM 142 in providing storage for instructions executed by SPM 104. Thus, in the preferred embodiment, certain software routines can be embedded in "firmware" in the form of masked ROM on board the SPM 104 chip as permanent program ROM 142, and other, additional or different software routines may be supplied dynamically to the SPM by RCP 102 for execution by the SPM out of program RAM 140A.

The program RAM 140A provides great additional flexibility. For example, it becomes possible for users to write their own encryption/decryption software routines for SPM 104, and then store those routines in the non-volatile memory 110 attached to radio control processor 102. Upon power up or at other appropriate times, RCP 102 may read the routines from RAM/ROM 110, and load them into the SPM 104 program RAM 140A for execution by the SPM. In this way, users can define their own proprietary encryption/decryption routines, and load them into the radio 100 "personality PROM" memory without involving the radio manufacturer at all. In addition, further flexibility is provided in terms of later changing or adding additional software for execution by SPM 104.

In order to facilitate and enable users to write their own speech processing 104 software routines, the preferred embodiment reserves a section of SPM program RAM 500 and a section of SPM data RAM 502 for user software routines and user data structures, respectively. This gives the user great additional flexibility in writing their own software routines as they desire.

In order to add further flexibility, the preferred embodiment uses a "jump" table in order to call SPM 104 software routines. Specifically, when the SPM 104 receives a command (e.g., to initialize the cryptographic string, write the cryptographic string, encrypt data, etc.) via the host command register HDR5, SPM references a table in data RAM 140B to determine the starting address of the routine. The SPM 104 retrieves that address, and then transfers control to the instruction at that address to actually execute the called routine. With the use of this "jump" table, all code within the SPM 104 becomes "relocatable"—since the only change that needs to be made in order to substitute one routine for another is to change the transfer address specified in the "jump" table. The benefit of this scheme lies in the fact that user encryption algorithms may be placed in relocatable memory, thus enabling the user to select and change the sizes and locations of actual encryption algorithms without notifying or involving the manufacturer of radio 100. This also allows new software to seamlessly replace outdated software stored in the SPM 104 masked ROM. Since all masked ROM calls traverse through RAM 140B, it becomes possible to "map out" a bad algorithm from the masked ROM and rewrite it into RAM.

Software Control of SPM 104

The highest level of software within SPM 104 is called "EXEC" (executive). EXEC software handles flexible speech data routing and services algorithm-specific data and control requirements. In general, the "EXEC" software provides the following overall functions:

- vocoding (i.e., voice "coding" in the transmit mode, and voice "decoding" in the receive mode);
- encryption/decryption; and
- command processing.

The code in the SPM 104 allows for both vocoding and encrypting to operate simultaneously. It is also designed to allow for stand-alone vocode and encrypt/decrypt operations.

Figure 5:
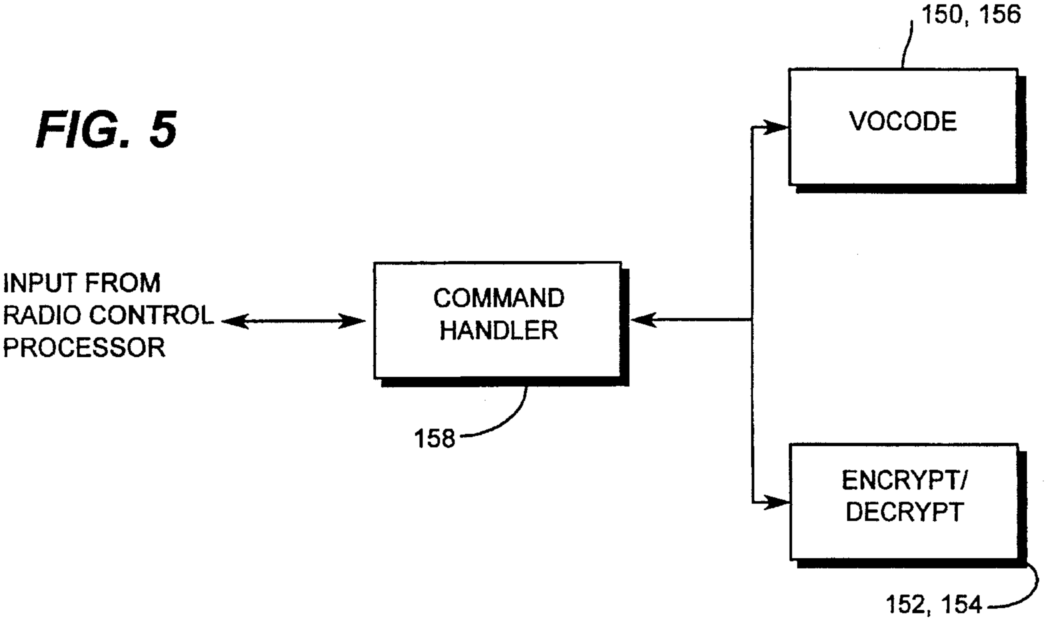
FIG. 5 is a high-level schematic illustration of the speech processing module command handling.

Software performed by SPM 104 includes a "command handler" that receives and handles algorithm-specific input parameters and mode selections, and passes these parameters and selections to the appropriate speech processing function blocks. The command handler returns algorithm-specific output parameters and status information to the RCP 102. A high-level schematic illustration of the command handler function 158 and its association with the vocode and the encrypt/decrypt functions is shown in FIG. 5.

Once RCP 102 uses the "command handler" to pass commands to SPM 104 so as to place the SPM in a real time speech processing mode, the SPM executes software instructions to process speech data in real time. FIG. 4A summarizes speech data throughput within the SPM 104 in the transmit mode. As shown in FIG. 4A, digitized speech provided by A/D converter 136 is first "coded" compressed with a suitable vocoder transformation 150, and is then encrypted by an encryption process 152 before being outputted to RCP 102. As an option, the encryption function 152 can be bypassed so that speech is vocoded only and not encrypted. In addition, as mentioned above, the RCP 102 may use SPM 104 as a stand-alone encryptor, thus passing such data through encryptor function 152 while "bypassing" vocoder function 150.

FIG. 4B is a schematic illustration of speech data processing performed by SPM 104 in a receive mode. As shown in FIG. 4B, SPM 104 receives speech data from RCP 102 and passes the speech data through a decryption process 154 and then through a suitable vocoder (expand) process 156. In this context, the vocoder function block 156 acts to "decode" (i.e., expand) the decrypted digitized speech before providing it to the D/A converter 138 for conversion to analog form. The resulting analog audio signal is applied in the preferred embodiment to loudspeaker 118. As an option, RCP 102 can control SPM 104 to bypass the decryption function block 154 so that the digitized speech is vocoded only and is not decrypted (this would be used when receiving "clear," unencrypted speech signals). In addition, if desired the RCP 102 can use SPM 104 as a stand-alone decryptor so that the RCP receives data decrypted by decryption function block 154 without it passing through the vocoder function 156.

More About Vocoding

The vocoder functions 150, 156 of SPM 104 compress and expand the digital audio bit stream. Compression decreases the number of bits required to represent a timed segment, or frame, of speech. This smaller number of bits may be processed and transmitted more efficiently. Expansion must "undo" the process of compression. It increases the number of bits just before digital-to-analog conversion.

Ericsson-GE currently uses two types of conventional sub-band vocoders. These are called VOICEGUARD and AEGIS. SPM 104 of the preferred embodiment supports both of these forms of vocoding. VOICEGUARD vocoding results in audio that sounds different from clear, non-vocoded audio. It is characterized by four sub-bands, octave band spacing, a frequency response of 180–290 Hz, a fixed bit allocation (3,2,2,1.3), hybrid BCPCM/APCM and spectral holes. AEGIS vocoding results in audi that is difficult to differentiate from clear, non-vocoded audio. AEGIS vocoding is characterized by eight sub-bands of equal size (362.5 Hz wide each), a response from DC to 2900 Hz, variable bit allocation depending upon input data, all BCPCM and a flat spectral response. As mentioned above, vocoding in the SPM 104 can be disabled by RCP 102. When this occurs, the analog-to-digital and digital-to-analog converters are also disabled. In this mode, RCP 102 is no longer sharing the encrypt/decrypt functions of SPM 104 with a real time speech data stream, and thus has immediate access to all encrypt/decrypt functions provided by SPM.

More About Encryption and Decryption

Figure 7:
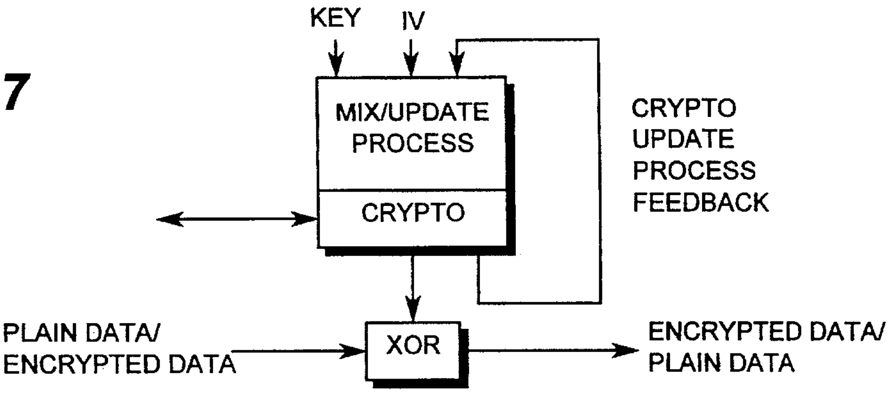
FIG. 7 is a schematic illustration of an exemplary encryption/decryption process shown in FIGS. 4A and 4B.

Encryption and decryption are means to scramble and unscramble data for security protection. Radio 100 provides encryption and decryption capabilities predominately to protect over-the-air audio transmission from eavesdroppers. FIG. 7 is a generic diagram of an encryption process. In this context, a "key" is a bit sequence which is fixed at both the encryption and decryption locations prior to data transfer. An "IV" is a pseudo random number ("initialization vector") which is mixed with the "key" to form the first crypro bit sequence in a transmission. The IV may be formed from a "random number" which is mixed with the key to form the first crypto bit sequence after powering up a radio. "Crypro" as appears in FIG. 7 is a bit sequence that is formed either by (1) mixing an IV with the key or (2) mixing the previous "crypro" with the key. Between updates, the crypro string is used to scramble and descramble data transmissions. Thus, plain text of clear data is scrambled by transforming it into encrypted data using the crypto string. This occurs at the transmitter end. EGE radio systems which employ encryption and decryption require that users on both ends of the transmission share the same key. They also require that users share the same IV. If these conditions are met, the result is a system where both receiver and transmitter share the same crypto string C. Sharing the same crypro string allows the receiving radio to decrypt the incoming speech. Thus, the preferred embodiment offers three different types of encryption/decryption (in addition to the ability to use additional or other user-defined encryption):

VGE (an EGE proprietary encryption algorithm),

VGS (a Swedish customer encryption algorithm), and

DES (an encryption technique developed by the U.S. Department of Commerce and described in FIPS 46 and other U.S. government documents).

At the receiver end, the "key" and the "IV" are the same as those being used at the transmit end, and the calculation of the "crypro" string is synchronized between the transmitter and the receiver so that they each end up with the identical "crypro" string. Since the "crypro" string is used as the input to an invertible transformer block (XOR), the same arrangement shown in FIG. 7 can be used to decrypt encrypted data into plain text data at the receiver. Thus, if P is the plain text data and E is the encrypted data and C is the crypro string, then E=P XOR C (this is "encryption")

P=E XOR C (this is called "decryption").

If the radio 100 is equipped for encryption, some encryption commands must be executed when the SPM 104 is first powered up. Specifically, RCP 102 issues a command for "encrypt-only" operation, then issues the command to "zeroize" all keys, and then issues the command to "load" the keys. This is a one-time operation that is used to initialize radio 100. Keys may be loaded from an external key loader device connected to radio 100 via a serial data connection as is well known. Additional information concerning conventional encryption and decryption process implementation, key storage and the like may be found in standard textbooks such as Schneier, Bruce, *Applied Cryptography* (Wiley & Sons 1994).

PIPELINE PROCESSING Within SPM 104

In the preferred embodiment, SPM 104 uses a "pipeline" approach to real time processing of digitized speech. Within the SPM 104, data is transferred between various processors at various rates and formats. These data rates and formats place restrictions on the vocoder and encryption functions. They also necessitate the use of storage buffers.

Figure 8A:
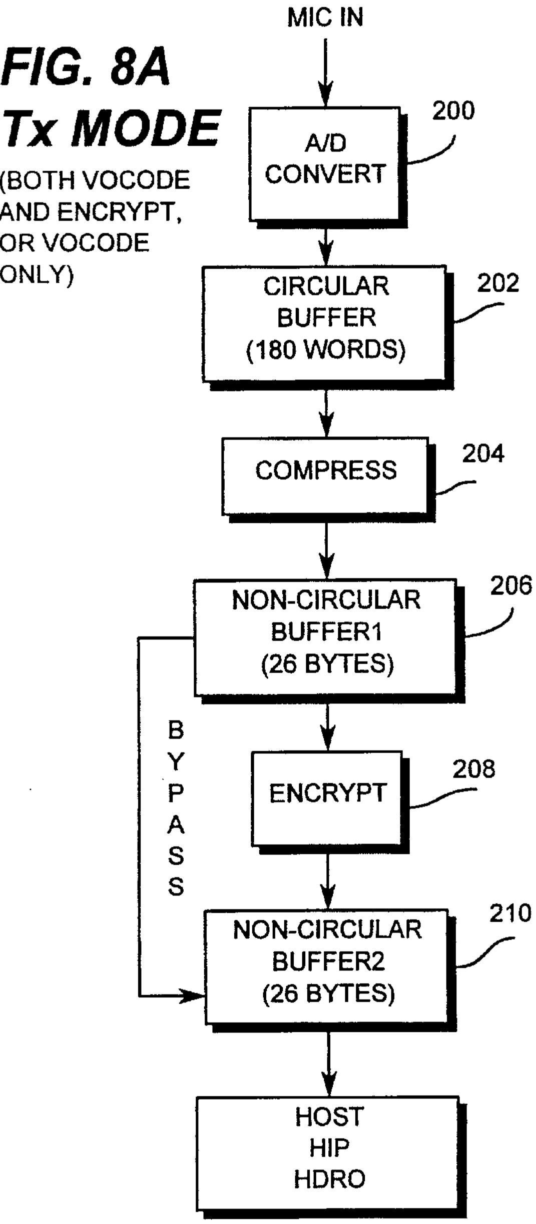
FIGS. 8A and 8B are more detailed signal processing flow diagrams of the steps performed by the speech processing module of FIG. 2 in the transmit mode and receive mode, respectively, for vocoding and encryption/decryption or vocoding only.

FIG. 8A is a schematic flow illustration of data passing through the various stages of a exemplary transmit mode "pipeline" processing performed by SPM 104. A-to-D conversion 200 accepts analog speech as its input, and in the preferred embodiment produces a 16-bit word every 165 microseconds in the preferred embodiment. This data stream is passed to the input of a circular buffer 202 comprising 180 words of data in the preferred embodiment. Circular buffer 202 stores a speech frame worth of data and holds samples during processor latency. The output of circular buffer 202 is 128 16-bit words every 22.5 milliseconds in the preferred embodiment. This output is passed to the compress function 204 which provides 204 bits of compressed data (25.5 bytes) every 22.5 milliseconds in the preferred embodiment. The output of compressor 204 is stored temporarily in a non-circular buffer1 206 26 bytes long. The purpose of buffer 206 is to align "nibbles" (i.e., half bytes) in preparation for a following encryption operation 208. Encryption operation 208 occurs in real time, encrypting 25/26 bytes every 22.5 milliseconds in the preferred embodiment. The encrypted data stream outputted by the encryption operation 208 is stored temporarily in a non-circular buffer2 210 that outputs the data stream a byte at a time, and outputs 25/26 bytes every 22.5 milliseconds in the preferred embodiment. Non-circular buffer2 210 services asynchronous reads by RCP 102. RCP 102 performs these reads by accessing the SPM 104 speech data register.

As also shown in FIG. 8A, if the data is not being encrypted, the output of the non-circular buffer1 206 is passed directly to the input of the non-circular buffer2 210.

Figure 8B:
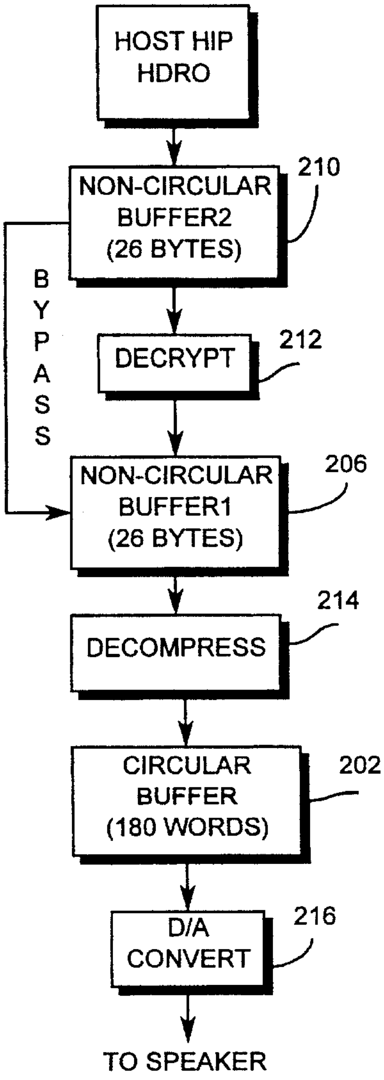

FIG. 8B is a flowchart of exemplary processing performed in a pipeline fashion by preferred embodiment SPM 104 operating in the receive mode. Data received over the air is demodulated by the digital transmitter/receiver 106 and is passed on to the RCP 102 in the preferred embodiment. RCP 102 provides this data on a byte-by-byte basis to SPM 104 by writing it into the SPM 104 speech data register.

SPM 104 takes the data written by RCP 102 to the SPM speech data register, and stores it temporarily in a non-circular buffer2 210. Since the preferred embodiment radio 100 operates in a half-duplex mode only, the same data structure 210 can be shared between the transmit mode and the receive mode (i.e., it is never used simultaneously for transmit and receive during half-duplex operations). Thus, in the receive mode, non-circular buffer2 210 services asynchronous writes by RCP 102 and provides 25/26 bytes every 22.5 milliseconds to a real time decryption process 212 which decrypts this data stream in real time. The decrypted output of decryption process 212 is stored in non-circular buffer1 206. If the decryption process 212 is bypassed, non-circular buffer2 210 directly provides its output to non-circular buffer1 206. In the received mode, non-circular buffer1 serves to perform nibble alignment on the decrypted datastream, and passes 25/26 bytes to a decompress process 214 in real time. Decompress process 214 decompresses 204 bits (25.5 bytes) every 22.5 milliseconds, and provides as an output 128 16-bit (decompressed) words every 22.5 milliseconds. This decompressed datastream is temporarily stored by circular buffer 202, which stores a speech frame worth of data and holds samples during processing latency. Circular buffer 202 provides its outputs to D/A convert process 216 (performed by D/A converter 138 in hardware) to produce analog speech output that is provided to loudspeaker 118.

Figure 9A:
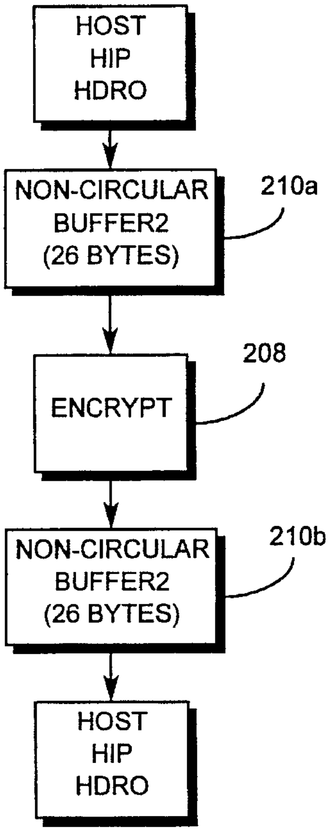
FIGS. 9A and 9B are more detailed signal flow diagrams of the processing performed by the speech processing module shown in FIG. 2 for encryption and decryption, respectively, without vocoding.
Figure 9B:
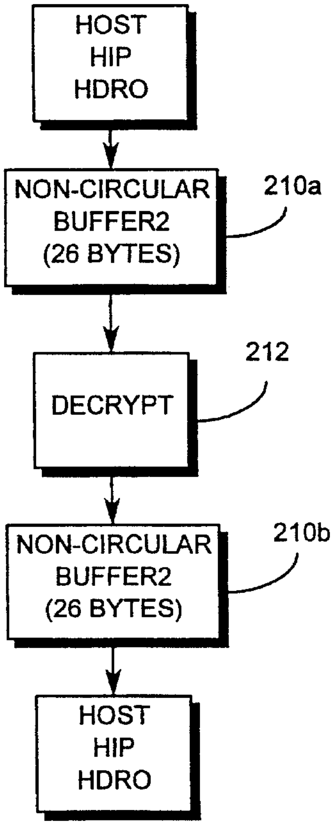

FIGS. 9A and 9B show exemplary pipeline processing performed by SPM 104 for the transmit mode and the receive mode, respectively, when the SPM is used only to encrypt. In this encrypt-only mode, the SPM 104 is not being used to process audio inputs or to generate audio outputs in real time. Rather, its sole job is as a "stand-alone" encryption/decryption module. It takes data provided by RCP 102, encrypts or decrypts the data, and provides the encrypted or decrypted data back to RCP 102. Thus, in the transmit mode as shown in FIG. 9A, RCP 102 writes data to be encrypted one byte at a time into the SPM 104 speech data register. This data is temporarily stored in non-circular buffer2 210A. Encryption process 208 operates on the data 8 bytes at a time, encrypts all 8 bytes together, and returns the encrypted results to non-circular buffer2 210. Non-circular buffer2 210 services asynchronous reads by RCP 102 via the speech data register. FIG. 9B shows a similar operation being performed using the decryption function 212 instead of the encryption function 208 when the RCP 102 wants to decrypt instead of encrypting it.

Over the Air Frame Format

Figure 11:
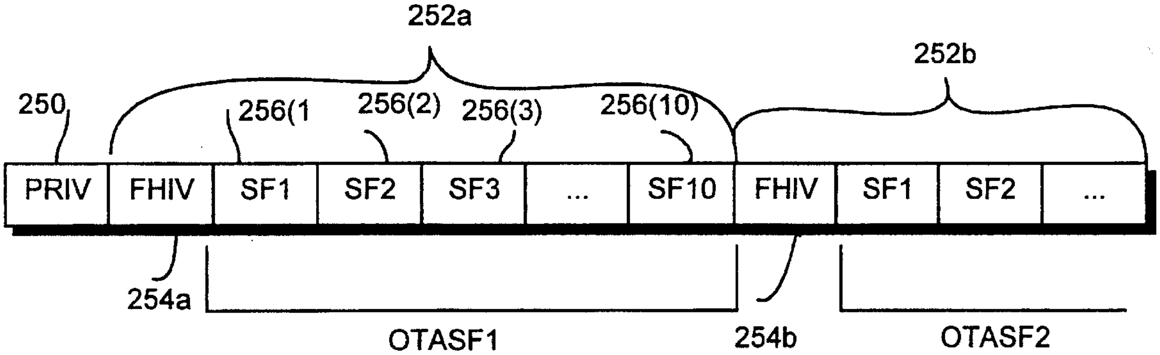
FIG. 11 is a schematic illustration of an exemplary over-the-air signalling format.

Before discussing some of the more detailed operations performed by RCP 102 in order to interact with SPM 104, it will be useful to explain the over-the-air data protocol used by EGE radio 100 in order to communicate digital data. FIG. 11 is a schematic illustration of an exemplary over-the-air digital protocol. More information regarding this overall protocol may be found in EGE's prior issued U.S. Pat. No. 4,757,536 to Szczutkowski et al. As shown in FIG. 11, a transmission begins with a transmission preamble "PRIV" 250, which is an abbreviation for "preamble IV." Preamble IV 250 is a transmission "header" which contains radio-to-radio synchronization patterns and multiple copies of the initial encryption initialization vector (IV). Following the preamble 250, there are a plurality of frames 252 each including a frame header field 254 and a plurality (i.e., 10) of speech packets 256. Frame header 254 incudes cryptographic and bit synchronization information, including a single copy of a current encryption initialization vector (which is used for late entry and ongoing cryptographic synchronization). Each speech packet 256 comprises a 22.5 millisecond segment of speech that has been parameterized into 25.5 bytes of digital speech data.

Constraints On SPM 104 Pipeline Cycle Times

The "pipeline" of the preferred embodiment requires that the encryption function process speech in 25, 26 and 8-byte chunks. This is accomplished by calls to an encryptor/decryptor function parameterized with the number of bytes as in input parameter. The pipeline requires that the speech vocoder compress and expand only complete frames. This results in an automatic 22.5 millisecond delay between frames. Because 204 bits (25.5 bytes) are produced in a 22.5 millisecond frame, the speech data rate may be expressed as 204 bits/22.5 milliseconds. Stated another way, the speech data rate is 9075 bits per second. Actual speech data rates may vary depending upon crystal oscillator tolerances and sample rate adjustments.

SPM 104 in the preferred embodiment is clocked at a frequency of 9.8304 mHz. Either a crystal or clock oscillator may be used. The instruction rate of the SPM 104 is equal to its clock frequency. In other words, the SPM 104 executes 9,830,400 instructions per second. Also, the on-board analog codec sampling rate of A/D converter 136 and D/A converter 138 is directly proportional to the clock frequency. A clock frequency of 9.8304 mHz results in a sampling frequency of 6.049477 kHz. In the preferred embodiment, the sampling frequency is converted at the codec/vodec interface by a factor of 17/18 (transmit mode) or 18/17 (receive mode) to change the speech rate to a value used by previous EGE AEGIS and VOICEGUARD vocoders.

The pipeline requires some correction. In particular, the encryption function needs a final write every over-the-air frame and the data rate must be adjusted per commands from RCP 102. As for the interface to RCP 102, critical timing for data transfers and command execution becomes apparent. Specifically, the vocoder function requires that the RCP 102 transfer the 25/26 byte chunks of speech data in less than 22.5 milliseconds. The encryption/decryption function also imposes timing restrictions. In order to generate new frame header IVs that occur at the beginning of each EGE digital frame, the encryption routine must be accessed every over-the-air speech frame. This must be finished before either (i) new speech data is passed from RCP 102 to SPM 104 for the encryption (receive mode) or (ii) the vocoder overwrites its data buffer to the encryptor (transmit mode). In both cases, speech data byte transfers should occur within 15 milliseconds of the RCP 102 interrupt, and new frame header IV generation occurs between one and five milliseconds after the last over-the-air speech data byte transfer.

Because these pipeline processes must operate in real time, cycle time for the SPM 104 is quite limited. Accordingly, it is important to use conventional techniques for minimizing the number of instructions that SPM 104 must perform for each of the various pipeline processing operations. The following are examples of exemplary memory sizes and operating cycles for a preferred AEGIS vocoder transmit mode and receive mode:

TX MODE-AEGIS

| Module | Cycles |
|---|---|
| Input Filter Bank | 9000 |
| Quantization | — |
| Buffers | |
| Statistics | 800 |
| Gain Encode | 700 |
| Bit Allocation | 400 |
| Sample Encode | 5000 |
| Error Protection | 600 |
| Total Encoder | 16500 |

Notice that AEGIS transmit takes 16500 instructions. The instruction rate is 9.8304 MIPS (million instructions per second). Therefore, an AEGIS speech frame compression takes 1.678 ms.

| RX MODE - AEGIS | |
|---|---|
| Module | Cycles |
| Error Decoding | 600 |
| Gain Decode | 250 |
| Deburp | 80 |
| Bit Allocation | 400 |
| Sample Decode | 1800 |
| Zero Band Fill | 270 |
| Output Filter Bank | 9000 |
| Total Decoder | 12400 |

Notice that AEGIS receive takes 12400 instructions. The instruction rate is 9.8304 MIPS. Therefore, an AEGIS speech frame expansion takes 1,261 ms.

Summarizing, the AEGIS vocoder processing block takes at most 1.678 milliseconds to execute. This execution time is acceptable because it is less than the frame rate of over-the-air signalling transmitted and received by the preferred embodiment digital radio 100. It turns out that the VOICEGUARD preferred embodiment vocoding process takes fewer over-all cycles than AEGIS, and therefore do not pose a significant constraint in terms of real time processing.

Control Steps Performed by RCP 102

Figure 12A:
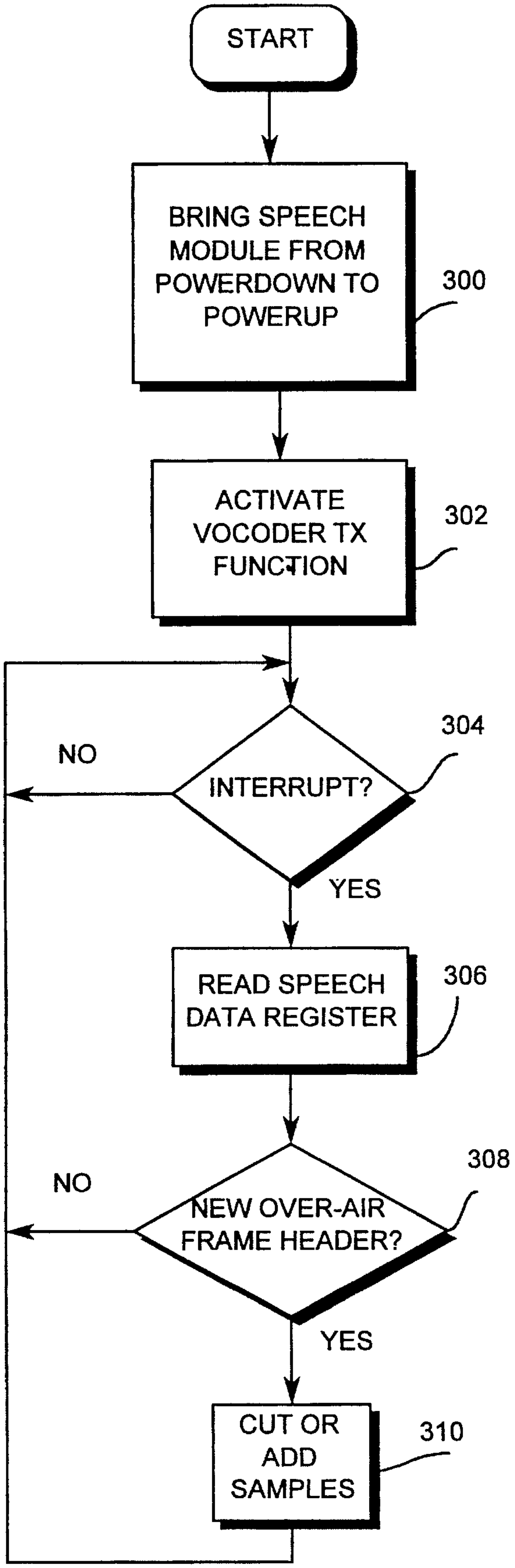
FIGS. 12A and 12B are flowcharts of exemplary program control steps performed by the radio control processor to control the speech processing module to transmit and receive, respectively, vocoded signals.

FIG. 12A is a flowchart of exemplary program control steps performed by RCP 102 in a transmit mode in order cause overall radio 100 to vocode but not encrypt, speech data. To start this process (e.g., in response to depression of the PTT, or push-to-talk button of radio 100), RCP 102 brings a SPM 104 from power down to power up by controlling the power down line 128 shown in FIG. 3 (block 300). Powering SPM 104 up and down requires more than just toggling the power down line 128. Of particular importance is to make sure that the SPM 104 never is powered down while it is in the idle mode. This causes a non-recoverable processor error. The following is a suitable example of a "power down" sequence performed by RCP 102:

(1) HOST sends command to ADI to Bypass IDLE mode.

(2) ADI sends status to HOST that command was successfully completed.

(3) HOST brings powerdown pin low. {power-down}

(4) ADI sends status to HOST that command was successfully completed. (The ADI reports status on powerdown pin state changes.)

Note that powerdown acknowledgment in step (4) must occur before bringing the powerdown pin high in the POWER UP sequence.

To power up the SPM 104, the RCP simply sets the power down line 128 "high," and then may read the status register HDR4 to see whether the command was successfully completed.

Once SPM 104 is powered up, RCP 102 activates the vocoder transmit function to provide AEGIS, VOICEGUARD, or other appropriate vocoding by writing an appropriate command to the command register HDR5. In response to this command, SPM 104 begins to digitize and vocode the analog signals being received from microphone 116, and outputting them to RCP 102 via the speech data register. Each time new data is ready to be read by RCP 102, SPM 104 interrupts the RCP by asserting the interrupt line 126 shown in FIG. 3. Upon receipt of the interrupt (decision block 304), SPM 104 reads the speech data register (block 306), and continues doing so until the SPM 104 deasserts the interrupt line. In addition, RCP 102 determines whether a new, over-the-air frame header 254 (see FIG. 11) is being generated (block 308). If a new over-the-air frame is being generated ("yes" exit to decision block 308), then RCP 102 may need to "cut" or "add" samples (block 310).

In the preferred embodiment, the SPM 104 interrupts RCP 102 for both receive and transmit speech data every 25/26 bytes. More specifically, in the transmit mode, when data for a speech frame (25/26 bytes) is ready for transfer, SPM 104 generates a host interrupt over host interrupt line 126. SPM 104 clears the interrupt when RCP 102 reads the last byte of the speech frame (25/26 bytes) from the speech data register HDR0. In the receive mode, when speech data is needed by SPM 104, SPM generates a host interrupt over line 126. SPM 104 clears the host interrupt when RCP 102 writes the last byte of the speech frame (26/25 bytes) to speech data register HDR0. In the preferred embodiment, the speech data is in "packed" format. In other words, the bits are loaded in and out of SPM 104 in the same format that exists in the modem. In the transmit mode, the bytes are transferred from SPM 104 to RCP 102 in speech frame blocks. These blocks switch in size from 25 bytes to 26 bytes. Note that a dummy value of "FF" precedes the speech frame block. RCP 102 reads then discards this value. In the receive mode, the bytes will be transferred from RCP 102 to SPM 104 again in speech frame blocks. However, these blocks will switch in size from 26 bytes to 25 bytes. A summary of this format in the preferred embodiment is as follows:

1 speech frame (22.5 ms. of speech )=204 bits.

1 over-the-air frame=2040 bits.

25 bytes=200 bits 26 bytes=208 bits

5 * 25 bytes=125 bytes=1000 bits

5 * 26 bytes=130 bytes=1040 bits

Therefore, an over-the-air frame equals 10 interwoven transmissions of 26/25/26/etc. bytes.

Thus, the RCP 102 is required to respond to these speech data hand-offs within 22.5 milliseconds in the preferred embodiment. RCP 102 will transfer the bytes to the SPM 104 from its receive modem speech data buffer, or will transfer the bytes from the SPM 104 to a transmit modem speech data buffer. Because the bit rates of the SPM 104 and the modem used by RCP 102 are not clocked from the same physical device in the preferred embodiment, and because of sampling rate conversion imperfections, the RCP 102 speech data buffers will run into pipelining problems unless precautions are taken.

In the transmit mode, the SPM 104 will pass bytes to the RCP 102 under control of the SPM. The RCP 102 will pass this data to a modem for transmission. The modem buffer maintained by RCP 102 will have an over-run or under-run of data depending upon the modem's transmission rate with respect to the speech data transfer rate of the SPM 104. In the receive mode, the SPM 104 will request bytes from the RCP 102 under control of the SPM. The RCP 102 will pass received modem speech data to the SPM 104. The modem buffer of RCP 102 will have an over-run or under-run of data, depending upon the modem's receiving rate with respect to the speech data transfer rate of the SPM 104. In both cases, the modem bit rate is assumed to be slightly out of synchronization with the bit rate of SPM 104.

The RCP 104 realizes that there is a problem because its modem speech data buffer is approaching empty or over-flow. In the preferred embodiment, RCP 102 can command the SPM 104 to correct for modem/SPM speech data synchronization problems. These functions in the preferred embodiment are called "cut_samples" and "add_samples." This is how they are used: the "cut_samples" function is used to prevent modem buffer over-running, and the "add_samples" function is used to prevent modem buffer under-running.

At command of RCP 102, the SPM 104 of the preferred embodiment will change the number of samples in the on-board codec data buffers to correct this error. In the preferred embodiment, at most only two samples will need to be "cut" or "added" per over-the-air speech frame. Also, the modem buffer of RCP 102 will grow/shrink at a maximum rate of one byte per second. Given these facts, the following rules can be used for cutting and adding:

1) If in the transmit mode, cut one sample if the modem buffer grows by one byte. If upon next over-the-air speech frame the buffer grows two bytes, cut two samples.

2) In the receive mode, cut one sample if the modem buffer shrinks by one byte. If upon next over-the-air speech frame the buffer shrinks two bytes, add two samples.

Another complication arises at the beginning of each frame. The vocoder in the preferred embodiment will produce output every speech frame. This output will consist of 25.5 bytes. Ten speech frames result in an over-the-air frame. In other words, 25.5 * 10=255 bytes make up an over-the-air frame. Notice that 255 is not divisible by 8. Yet, the encryption algorithm of the preferred embodiment operate on 8 bytes of data at a time. This processing constraint results in an "undefined" cryptographic string at the end of an over-the-air frame. Consequently producing a new frame header initialization vector 254 is difficult to define. To resolve this problem, a final byte is written to the encryptor after the last speech byte of the over-the-air frame is encrypted. Now, when a new frame header IV is derived, 256 bytes will have passed through the encryptor. In other words, writing a final byte to the encryptor results in a define cryptographic string at the end of the over-the-air frame. This, in turn, results in a defined frame header IV 254 which will start off the next over-the-air frame. SPM 104 automatically takes of this "final byte" encryption in the preferred embodiment by inserting a "dummy" input byte every 255 speech bytes. At the same time, consider the case where the SPM 104 is performing in encrypted receive mode. It has given RCP 102 a request for the tenth set of speech bytes. The RCP 102 complies and awaits an indication from SPM 104 that the encryption device is free for generation of the next frame header initialization vector. The SPM 104 gives the go-ahead for RCP 102 to process a new frame header with an "eleven interrupt."

At this point, the SPM 104 must release control of the interrupt line 126 to RCP 102. This is necessary because of the variability in frame header initialization vector processing times required by different encryption techniques. In the preferred embodiment, RCP 102 processes the frame header initialization vector. When RCP 102 is finished, it performs the SPM 104 new interrupt force command. This causes the SPM 104 to release the current interrupt (before RCP 102 times out) and force a new interrupt for the next speech data.

Figure 12B:
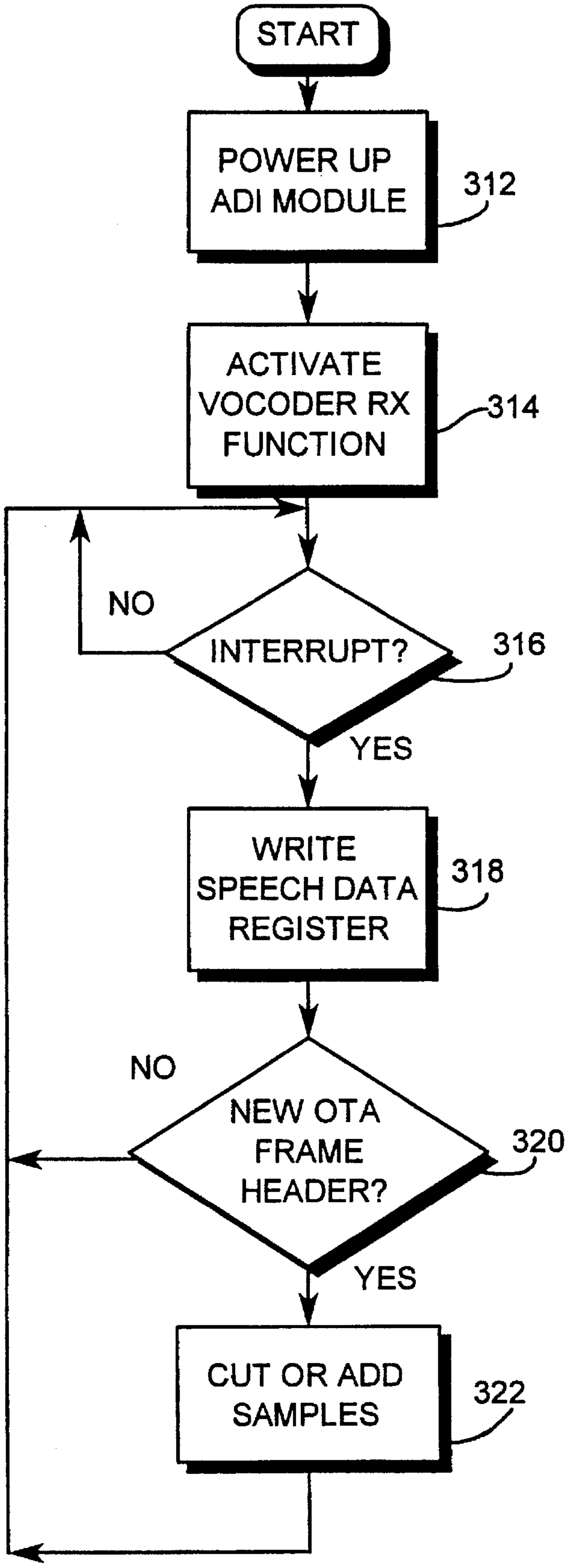

FIG. 12B is a flowchart of exemplary program control steps performed by RCP 102 in the preferred embodiment in order to control SPM 104 to vocode (i.e., expand) in the receive mode. These steps shown in FIG. 12B are similar to those shown in FIG. 12A with the exception that block 318 is used to write received data to the speech data register in the receive mode (as opposed to reading from the speech data register as in the transmit mode shown in FIG. 12A).

Figure 13A:
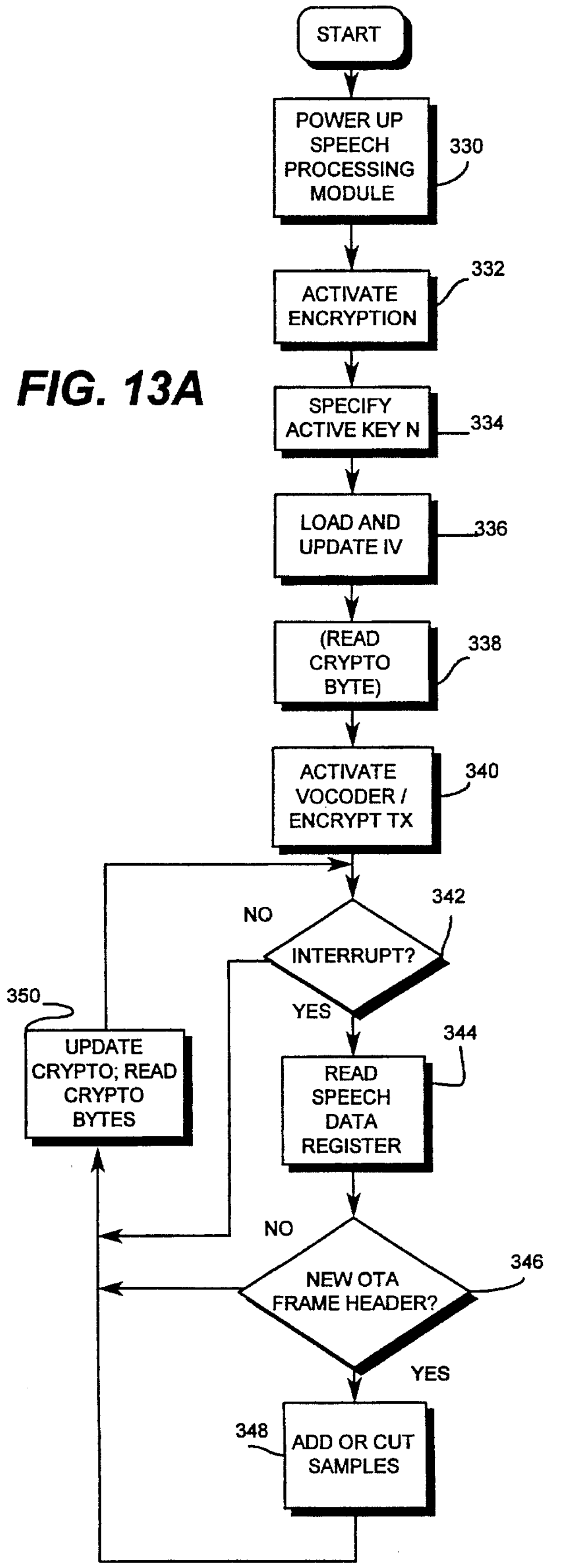
FIGS. 13A and 13B are flowcharts of exemplary program control steps performed by the radio control processor to vocode and encrypt (decrypt) signals in the transmit and receive modes, respectively.

FIG. 13A is a flowchart of exemplary program steps performed by RCP 102 in the preferred embodiment in order to vocode and encrypt data for transmission over the air. As before, RCP 102 powers up the SPM (block 330), and then activates the encryption function (block 332) by providing an appropriate command to the SPM 104 command register. RCP 102 then specifies an act of encryption key (block 334) for use in the encryption process, and loads and updates an appropriate initialization vectral (block 336). RCP 102 then reads the cryptographic string CRYPTO from SPM 104 so that it can transmit updated initialization vectors in order to maintain cryptographic synchronization between the receiver and the transmitter (block 338). Next, RCP 102 activates the vocoder/encryption transmit function of the SPM 104 (block 340) by writing an additional command to the SPM. This command causes the SPM 104 to begin vocoding and encrypting signals provided from microphone 116 in real time and providing the vocoded, encrypted datastream to RCP 102 via the speech data register.

Whenever RCP 102 receives an interrupt from the SPM 104 (decision block 342), it reads a speech data register (block 344) and provides the results to the transmit modem for transmission over the air. In addition, if a new frame has begun (block 346), RCP 102 "adds" or "cuts" samples as described above (block 348). Irrespective of when interrupts occur, RCP 102 periodically reads the cryptographic string currently maintained by SPM 104 and updates its cryptographic string information based on that in order to allow it to form the next frame header 254.

Figure 13B:
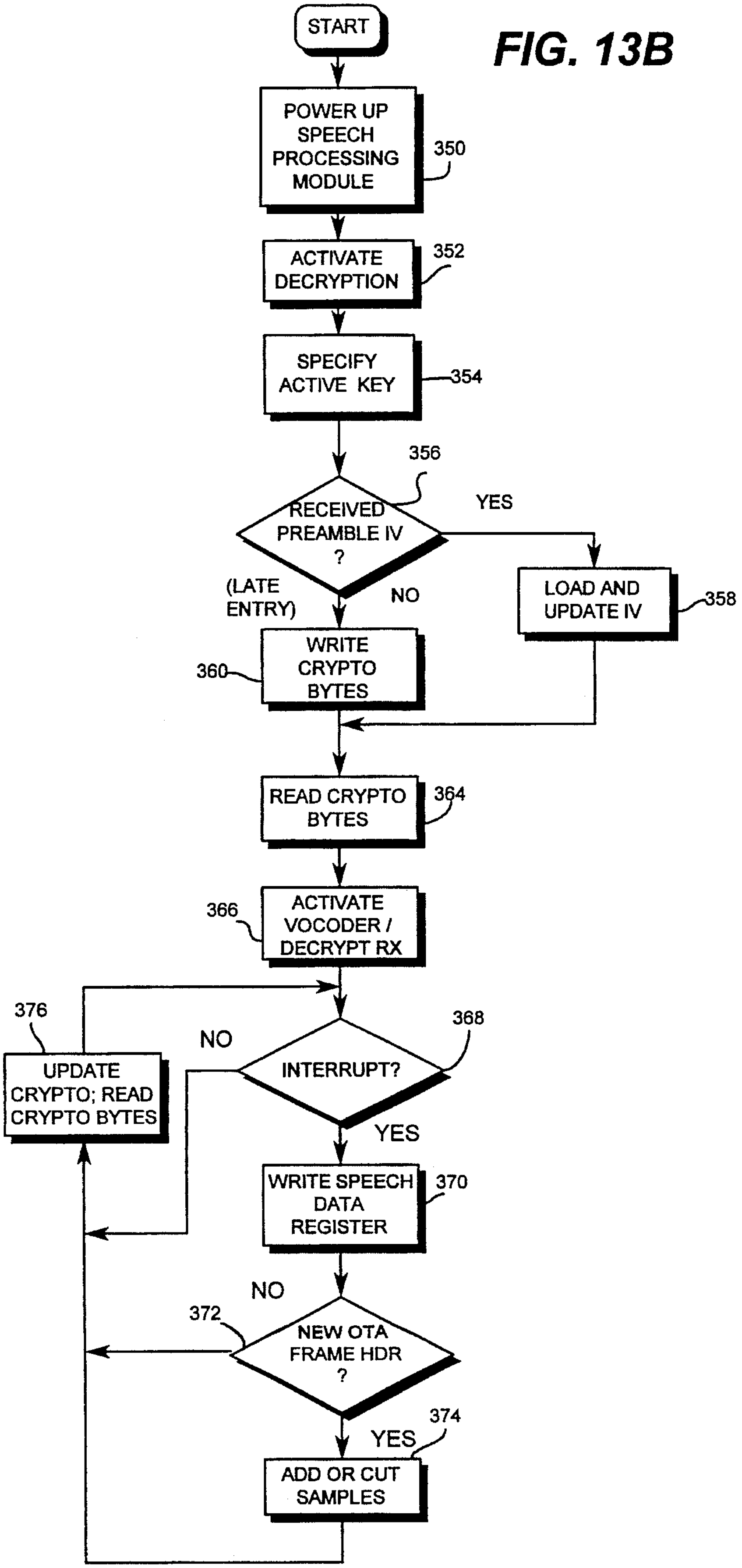

FIG. 13B is a flowchart of exemplary program control steps performed by RCP 102 in order to vocode and decrypt information received over the air. Upon receiving encrypted information, RCP 102 examines the received header information in order to identify the associated group or individual making the call, and then accesses and specifies to SPM 104 the appropriate active encryption key (block 354). RCP 102 then determines whether it has received the transmission preamble 250 (decision block 356). If it has, then RCP 102 loads and updates the appropriate initialization vector (block 358). If radio 100 is receiving encrypted data and the RCP 102 has not received the transmission preamble initialization vector 250, then the radio must be receiving signals based upon "late entry" into the communication ("no" exit to decision block 356). In case of late entry, the RCP 102 writes the cryptographic string it can derive from the frame header initialization vector 254 (which provides late entry as well as on-going cryptographic synchronization) to the SPM 104 in order to initialize the SPM to the "current" cryptographic initialization vector (block 360). RCP 102 then reads the cryptographic string from SPM 104 (block 364), and finally activates the vocoder/decryption receive function (block 366). Blocks 368–376 shown in FIG. 13B are similar to blocks 342–450 of FIG. 13A, except that RCP 102 is in this case writing data to the speech data register for decryption and expansion by the SPM 104.

Figure 14A:
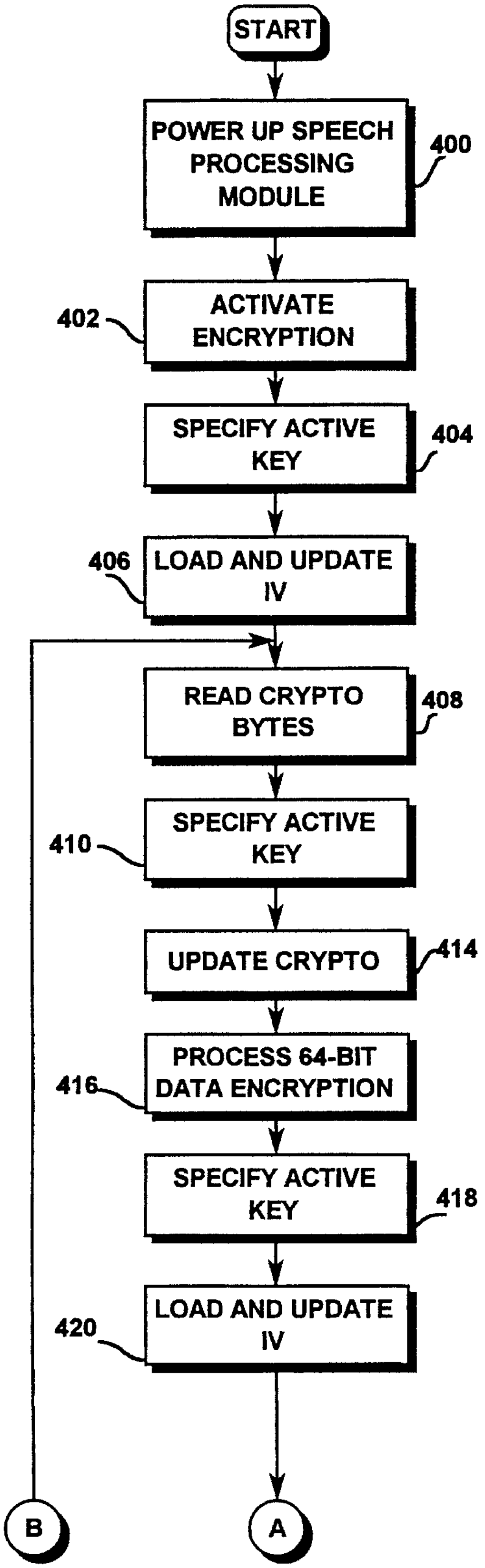
FIGS. 14A and 14B together are a flowchart of exemplary program control steps performed by the radio control processor to control the speech processing module to vocode (compress) speech and encrypt it using the DES encryption in the transmit mode.
Figure 14B:
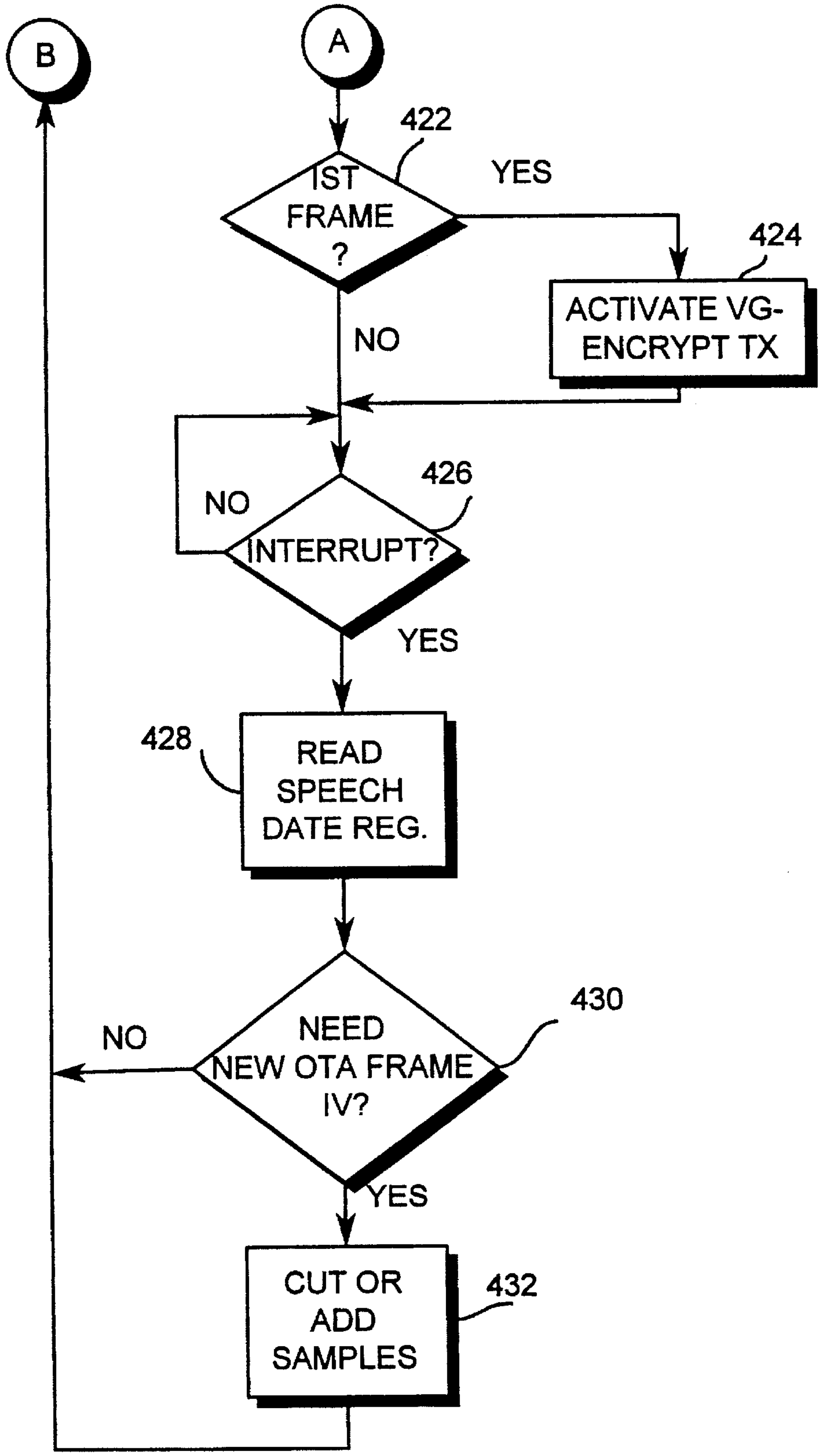
Figure 15A:
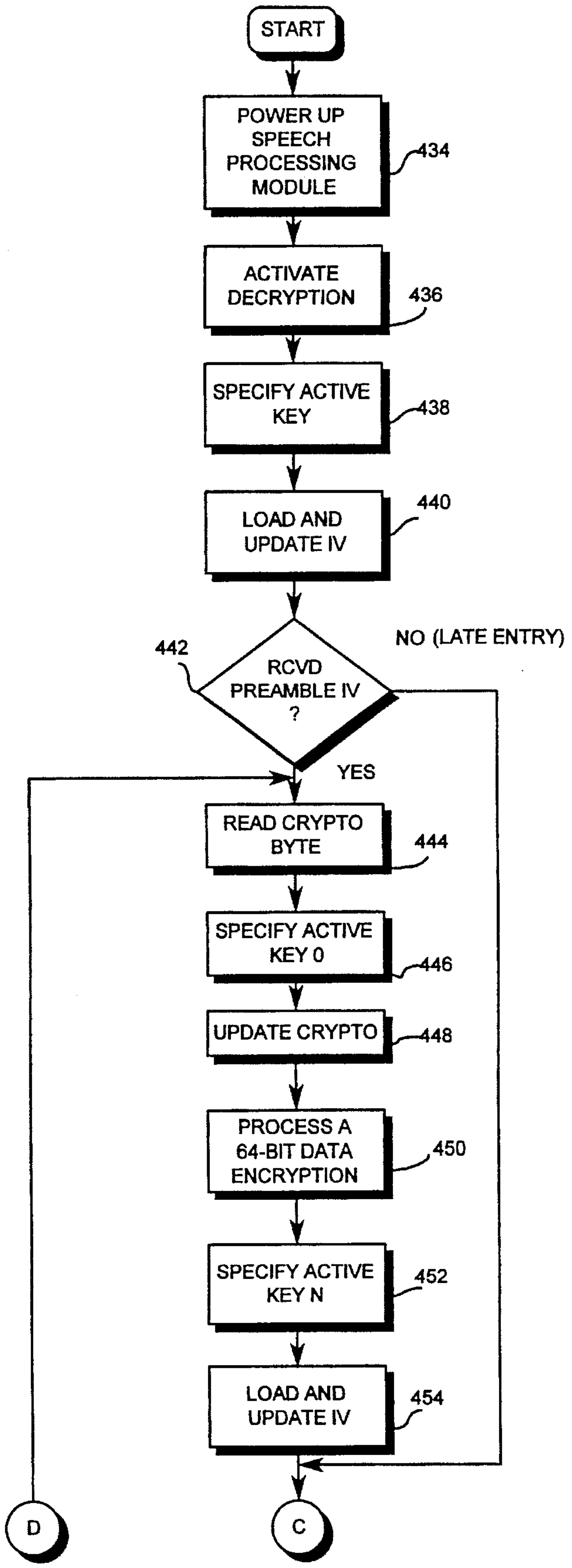
FIGS. 15A and 15B together are a flowchart of exemplary program control steps performed by the radio control processor to decompress and decrypt, using DES, speech in the receive mode by controlling the speech processing module.
Figure 15B:
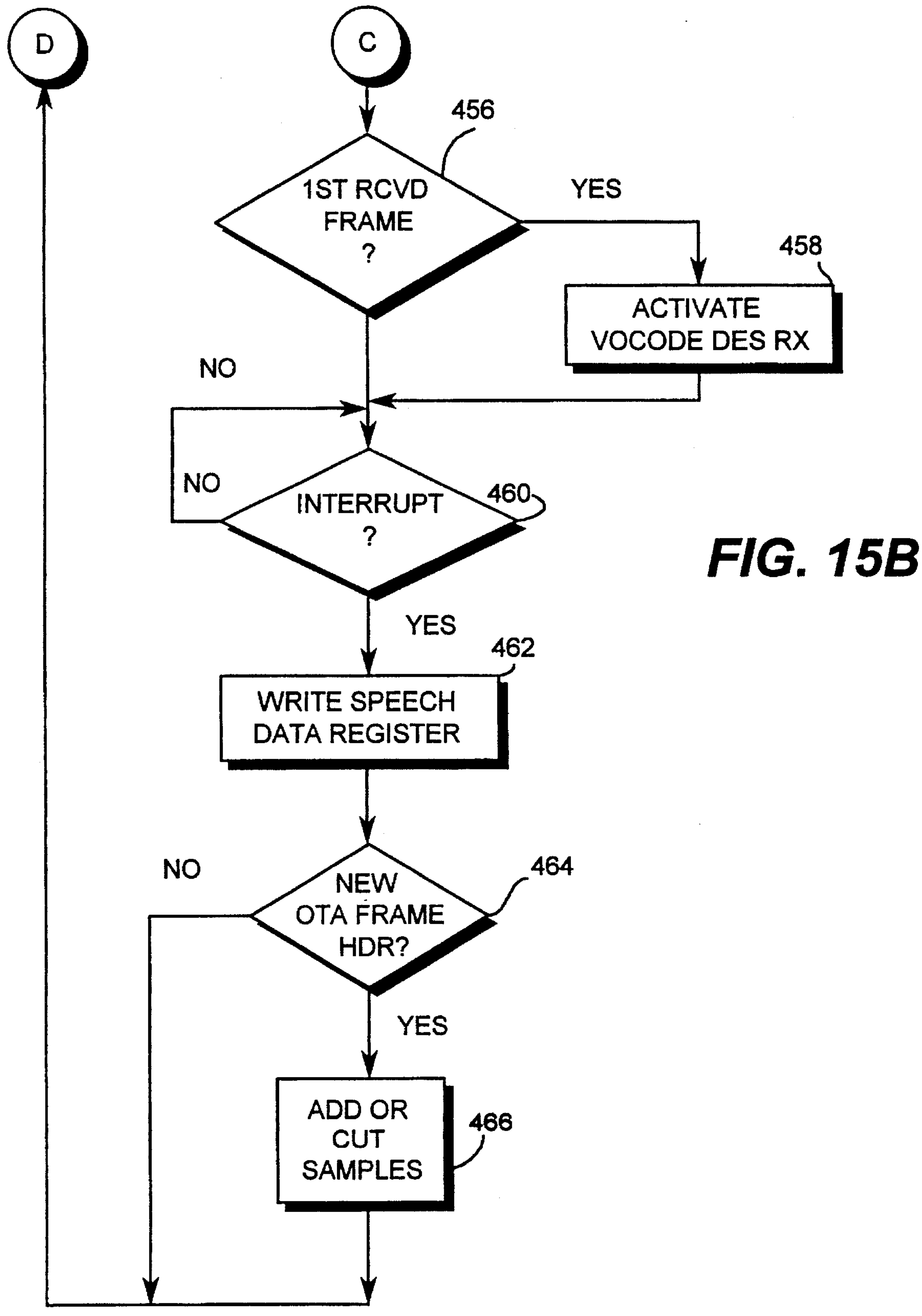

FIGS. 14A–14B are exemplary program control steps performed by RCP 102 to provide vocoding and encryption in the transmit mode using DES encryption (and FIGS. 15A–15B shown exemplary program control steps performed by the RCPs to provide vocoding and DES decryption in the receive mode). While these steps are similar to those shown in FIGS. 13A and 13B, there are some slight differences. For example, block 416 shown in FIG. 14A provides that RCP 102 processes a 64-bit data encryption using the cryptographic string the RCP reads at block 408. This is done in order to provide a new DES initialization vector for the next frame header 254. As can be seen from FIGS. 14A–14B, 15A and 15B, there are some slight additional minor variations in the overall flow of the steps that are performed.

More Detail About How RCP 102 Commands SPM 104

Figure 6:
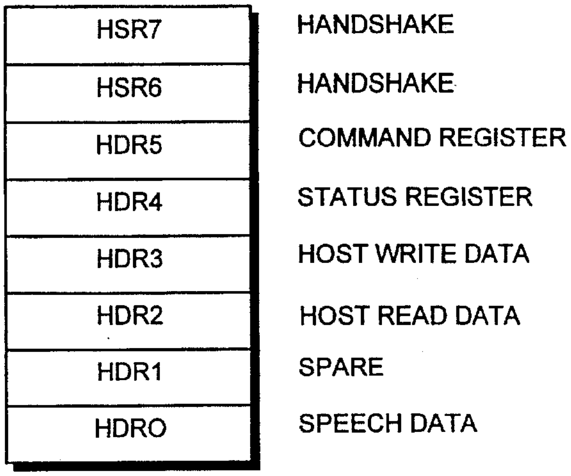
FIG. 6 is a schematic illustration of the microprocessor register interface provided by the speech processing module shown in FIG. 2.

As described above, RCP 102 in the preferred embodiment actually has the ability to control SPM 104 on a detailed level in the preferred embodiment. As will be understood from the discussion above, RCP 102 communicates digitally with SPM 104. The SPM 104 provides parallel port for general-purpose, full duplex communications. This parallel I/O port which allows the SPM to act as a memory mapped peripheral of RCP 102, is know as the Host Interface Port ("HIP"). The HIP is a group of 8-bit registers. A schematic illustration of these HIP registers is shown in FIG. 6. Six HIP registers (HRD5–HRD0) contain data. The other two HIP registers (HSR6, HSR7) contain status information. The HIP data registers can be thought of as a block of dual-ported memory 132. These HDR registers can be accessed by both the RCP 102 and the core processor 134 within the SPM 104. The HIP status registers (HSR7–HSR6) provide the read-write status of the HDR's to both the RCP 102 and the SPM core processor 134.

In the preferred embodiment, one of the HIP registers (HDRS) is used as a command register that can be written to only by RCP 102. RCP 102 writes a command to SPM 104 by writing 6 bits into this command register HDRS. The following is an example of a subset of suitable command definitions for the command register contents:

Activate AEGIS TX
: Initialize and activate AEGIS vocoder for unencrypted speech transmission.

Activate AEGIS RX
: Initialize and activate AEGIS vocoder for unencrypted speech reception.

Activate VG TX
: Initialize and activate VG vocoder for unencrypted speech transmission.

Activate VG RX
: Initialize and activate VG vocoder for unencrypted speech reception.

Activate Encryption
: Initialize and activate standalone encryption.

Activate AEGIS Encrypt TX
: Initialize and activate AEGIS vocoder and encryption for speech transmission.

Activate AEGIS Encrypt RX
: Initialize and activate AEGIS vocoder and encryption for speech reception.

Activate VG Encrypt TX
: Initialize and activate VG vocoder and encryption for speech transmission.

Activate VG Encrypt RX
: Initialize and activate VG vocoder and encryption for speech reception.

Set HOST Interrupt HI
: Set interrupt HI.

Set HOST Interrupt LOW
: Set interrupt LOW.

Load Encryption Key

Zeroize Key(s)

Read Crypto String

Write Crypto String

Load and Update IV
: Update the CRYPTO using the loaded IV.

Update Crypto
: Update the CRYPTO using the current CRYPTO.

Specify Active Key
: Specify the encryption key to use.

Process a 64-bit Data Encryption
: Produce XOR-encrypted data. Simultaneously update the CRYPTO when required.

Add to Buffered CODED Samples
: Make up for discrepancies between HOST modem and ADI CODEC rates.

Cut from Buffered CODEC Samples
: Make up for discrepancies between HOST modem and ADI CODEC rates.

New Interrupt Force
: Forces the HOST interrupt to reset high and then to return low again. Used for encryption.

A listing of descriptions of exemplary software routines used by SPM 104 in the preferred embodiment to perform the pipeline operations shown in FIGURES 8A, 8B, 9A, and 9B are attached to this patent application as Appendix A. Since each of the functions associated with these routines are well-defined, a person of ordinary skill in the art could develop suitable detailed software for execution by SPM 104 based on the information contained in this patent application, the instruction manuals for the Analog Devices DSP, and other information available to such a person.

Status register HDR4 in the preferred embodiment is used to allow the SPM 104 to inform RCP 102 of the status of the SPM. In the preferred embodiment, two bits of the status register HDR4 are used as follows:

Bit 0 command success

Bit 1 command failure.

Handshake registers HSR6, HSR7 are used to coordinate reading and writing of the dual port memory 132 in the preferred embodiment. RCP 102 reads handshake register HSR6 before the RCP conducts a write to the corresponding HDR. This is done to make sure that the RCP 102 does not overwrite data which is not yet been processed by the SPM 104. Handshake register HSR7 bit 4 is read by RCP 102 before the status and host read registers are read.

The host write data register HDR3 in the preferred embodiment is used to transfer data from RCP 102 to SPM 104. Some of the commands requiring that data be sent by RCP 102 to SPM 104 are as follows:

Zeroize Keys
: One data byte (actually 4 bits) is written to HDR3 to signify which key(s) to zeroize.

Process a 64-bit Data Encryption
: Eight plain text data bytes are written to HDR3.

Write Crypro Bytes
: Eight CRYPTO bytes are written to HDR3.

Load and Update IV
: Eight IV data bytes are written to HDR3.

Specify Active Key
: One data byte specifying a key address to use is written to HDR3.

Add Sample(s)
: One data byte containing the number of samples to add is written to HDR3.

Cut Sample(s)

One data byte containing the number of samples to cut is written to HDR3.

Host read data register HDR2 is used to return data from SPM 104 to RCP 102. Some of the commands performed by SPM 104 return data upon completion. In the preferred embodiment, before the true data bytes appear, a dummy byte of "FF" must be read and discarded from the register. The following are examples of commands which return data to RCP 102:

Read Crypro Bytes

The eight crypto data bytes are read from HDR2.

Process a 64-bit Data Encryption

The eight XOR-encrypted data bytes are read from HDR2.

Read ROM version

Eight data bytes containing a ROM version are read from HDR2.

A new digital radio has been disclosed which includes codec, vocoder and encryption/decryption processing all on a single integrated circuit chip module. Great flexibility is provided in terms of different operating modes (e.g., encrypt/decrypt only, vocode only, or encrypt/decrypt and vocode). Radio control processor overhead is reduced substantially, because the radio control processor does not need to transfer data between codec, vocoder and encryption/decryption processes and/or components. An internal executive routine within the module handles all vocoder and encryption command and data processing. A special synchronization scheme is provided to synchronize the transceiver modem rate with the speech processing rate. The single-chip speech processing module is sufficiently flexible to allow users to define, write, load and use their own encryption/decryption routines without requiring a new masked ROM.

APPENDIX A

| | |
|---|---|
| | VOCODER ROUTINES: |
| Name: | Init_AEGIS_TX |
| Description: | Initializes variables and pointers used to compress speech using AEGIS vocoder. |
| Inputs: | None |
| Outputs: | None |
| Name: | Init_AEGIS_RX |
| Description: | Initializes variables and pointers used to expand speech using AEGIS vocoder. |
| Inputs: | None |
| Outputs: | None |
| Name: | Init_VG_TX |
| Description: | Initializes variables and pointers used to compress speech using VOICEGUARD vocoder. |
| Inputs: | None |
| Outputs: | None |
| Name: | Init_VG_RX |
| Description: | Initializes variables and pointers used to expand speech using VOICEGUARD vocoder. |
| Inputs: | None |
| Outputs: | None |
| Name: | Comp_AEGIS_TX |
| Description: | Compresses a window of speech data using AEGIS. |
| Inputs: | 128 16-bit words from a circular data input buffer. |
| Outputs: | 204 bits to a data output buffer. |
| Name: | Expan_AEGIS_RX |
| Description: | Expands a window of speech data using AEGIS. |
| Inputs: | 204 bits from a data input buffer. |
| Outputs: | 128 16-bit words to a circular data output buffer. |
| Name: | Comp_VG_TX |
| Description | Compresses a window of speech data using |

APPENDIX A-continued

| | |
|---|---|
| | VOICEGUARD |
| Inputs: | 128 16-bit words from a circular data input buffer. |
| Outputs: | 204 bits to a data output buffer. |
| Name: | Expan_VG_RX |
| Description: | Expands a window of speech data using VOICEGUARD |
| Inputs: | 204 bits from a data input buffer. |
| Outputs: | 128 16-bit words to a circular data output buffer. |
| | ENCRYPTION/DECRYPTION ROUTINES: |
| Name: | Init_Crypt |
| Description: | Initializes variables and pointers used to encrypt speech. (Encrypts the IV in VGS.) |
| Inputs: | None. (KEY and IV in VGS.) |
| Outputs: | None |
| Name: | Zero_Keys_8 |
| Description: | Writes zero's to one or all of the 8 byte keys. |
| Inputs: | Key number to zeroize (or ALL.) |
| Outputs: | None |
| Name: | Zero_Keys_16 |
| Description: | Writes zero's to one or all of the 16 byte keys. |
| Inputs: | Key number to zeroize. (or ALL.) |
| Outputs: | None |
| Name: | Load_Key_8 |
| Description: | Writes 8 bytes to one of 8 keys. |
| Inputs: | A key address from zero to seven. 8 bytes of key data. |
| Outputs: | None. |
| Name: | Load_Key_16 |
| Description: | Writes 16 bytes to one of 8 keys. |
| Inputs: | A key address from zero to seven. 16 bytes of key data. |
| Outputs: | None. |
| Name: | Load-Update_IV |
| Description: | Reads 8 IV bytes. Mixes the IV with the active key and updates the CRYPTO. |
| Inputs: | 8 IV bytes. |
| Outputs: | None |
| Name: | Update_Crypto |
| Description: | Mixes the current CRYPTO with the active key and updates the CRYPTO. |
| Inputs: | Number of bytes to update. (NUMENCBYTES) A flag to signal that the update is not caused by speech. (SPDATAEN) |
| Outputs: | None |
| Name: | Specify_Active_Key |
| Description: | Selects one of 8 keys. Processes key in preparation for loading an IV. |
| Inputs: | A key address from zero to seven. |
| Outputs: | None |
| Name: | Encrypt_Data_Bytes |
| Description: | Encrypts data bytes by XOR with CRYPTO. The CRYPTO is updated when applicable. |
| Inputs: | The number of data bytes to encrypt. (NUMENCBYTES) A flag to signal if the data is speech. (SPDATAEN) A pointer to the first input byte. (I0) |
| Outputs: | A pointer to the first output byte. (I1) |
| Name: | Read_Crypto_Bytes |
| Description: | Reads 8 crypto bytes. (Reads 8 IV bytes in VGS.) |
| Inputs: | None |
| Outputs: | 8 crypto bytes. |
| Name: | Write_Crypto-Bytes |
| Description: | Writes 8 crypto bytes. (Writes 8 IV bytes in VGS.) |
| Inputs: | 8 crypto bytes |
| Outputs: | None. |
| Name: | Zero_Keys_8 |
| Description: | Writes zero's to one or all of the 8 byte keys (DES). |
| Inputs: | Keynumber to zeroize. (or ALL.) |
| Outputs: | None. |
| Name: | Load_Key_8 |
| Description: | Writes 8 bytes to one of 8 keys (DES). Checks for key zeroization and parity errors. |
| Inputs: | A key address from zero to seven. 8 bytes of key data. |
| Outputs: | Key parity error status |
| Name: | Specify_Active_Key |

APPENDIX A-continued

| | |
|---|---|
| Description: | Selects one of 8 keys (DES). Checks for key zeroization and parity errors. Processes key in preparation for loading an IV. |
| Inputs: | A key address from zero to seven. |
| Outputs: | Key zeroization error status |
| | MISCELLANEOUS ROUTINES |
| Name: | Cut_Samples |
| Description: | Removes samples from the ADI codec RX & TX buffers |
| Inputs: | RX/TX mode selection; number of samples. |
| Outputs: | None |
| Name: | Add_Samples |
| Description: | Adds samples to the ADI codec RX & TX buffers |
| Inputs: | RX/TX mode selection; number of samples. |
| Outputs: | None. |

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a radio commnunications system, a single chip speech processing module having an analog speech signal connection, a data connection, an analog signal processor connected to the analog speech signal connection and a digital signal processor connected to the data connection, said single chip speech processing module comprising:

a converter within the analog signal processor for performing a CODEC function of converting between said analog speech signals and first digital speech signals;

the digital signal processor being connected to said analog signal processor and including means for processing a stream of speech information in real time by synchronously performing the following functions:

converting between said first digital speech signals and vocoded digital speech signals: and for converting between said vocoded digital speech signals and encrypted digital speech signals; and wherein the module further includes data input/output circuitry connected between said digital signal processor and said data connection for coupling said encrypted digital speech signals between said digital signal processor and said data connection.

2. A method for processing speech signals in real time within a single chip mixed signal speech processing module, said single chip mixed signal speech processing module having at least one analog speech signal pin and at least one data connection pin, said method comprising the following steps:

(a) converting between said analog speech signals and first digital speech signals;

(b) converting between said first digital speech signals and vocoded digital speech signals;

(c) converting between said vocoded digital speech signals and encrypted digital speech signals;

(d) coupling said encrypted digital speech signals to/from said data connection; and (e) synchronizing said steps (a)–(d) within the chip so as to process a stream of speech information in real time.

3. A digital radio comprising:

at least one audio source providing analog signals;

a single chip mixed signal speech processing module connected to receive said analog signals, said speech processing module performing the following functions:

(a) converting said analog signals to digital signals, (b) compressing said digital signals into compressed digital signals, (c) encrypting said compressed digital signals, (d) outputting said encrypted, compressed digital signals; and (e) synchronizing said steps (a)–(d) within the chip to process a stream of speech information in real time and RF transmitting circuitry connected to receive said encrypted compressed digital signals outputted by said single chip speech processing module, said RF transmitting circuitry generating a radio signal containing said encrypted, compressed digital signals and transmitting said radio signal over the air.

4. A digital radio comprising:

at least one audio destination requiring an output analog signal;

RF transceiving circuitry for transmitting RF signals over the air and for receiving RF signals transmitted over the air;

a control microprocessor connected to control said RF transceiving circuitry; and a memory limited mixed signal speech processing chip coupled to said control microprocessor and to said input and output analog signals, said speech processing chip including an analog signal processor and a digital signal processor, said speech processing chip for:

(a) converting said input analog signal to a digital signal, (b) compressing said digital signal, (c) encrypting said digital signal; and (d) synchronizing said steps (a)–(c) to process a stream of speech information in real time.

5. A digital radio communications system including:

an antenna;

a radio frequency transceiver section connected to said antenna;

a speech processing module comprising a mixed signal integrated circuit having an analog signal processor and a digital signal processor; and a control processor coupled to said radio frequency transceiver section and said speech processing module, said control processor for coupling digital data between said radio frequency transceiver and said speech processing module;

wherein said speech processing module is controllable by said control processor to perform any/all of the following functions in a synchronized manner in real time for a stream of speech information:

(a) encrypt or decrypt said digital data, (b) compress or expand said digital data, and (c) convert between analog signals and digital data.

6. A system as in claim 5 wherein said control processor writes a command to said speech processing module, said command specifying which functions said speech processing module is to perform.

7. A system as in claim 6 wherein one of said commands is to cut samples.

8. A system as in claim 6 wherein one of said commands is to add samples.

9. A speech processing system including:

a mixed signal processing integrated circuit including a digital signal processor and an analog signal processor,;

a read only memory for storing program control instructions for execution by said digital signal processor, the program control instruction including at least a vocoding routine and an encryption routine;

a random access memory coupled to said digital signal processor; and loading and controlling means coupled to said random access memory for loading further encryption program control instructions into said random access memory, and for controlling said digital signal processor to execute said further encryption program control instructions in addition to or in lieu of said encryption routine stored in said read only memory.

10. A speech processing system as in claim 9 wherein said loading and controlling means includes means for loading a jump table into said random access memory, said jump table directing at least some program calls by said digital signal processor to program instructions stored in said read only memory, and directing at least some other program calls by said digital signal processor to program instructions loaded into said random access memory.

11. A digital radio including:

means for transmitting and receiving RF signals; and a speech processing module including a digital signal processor, an analog signal processor and a program store, said analog signal processor performing a CODEC operation, said program store storing first and second sets of program control instructions, said digital signal processor executing said first set of program control instructions to perform encryption and decryption, said digital signal processor executing said second set of program control instructions to perform vocoding, said digital signal processor synchronizing execution of said first and second sets of program control instructions to encrypt or decrypt and vocode a digitized speech data stream in real time.

* * * * *